US012657742B2

(12) United States Patent
Goesele et al.

(10) Patent No.: US 12,657,742 B2
(45) Date of Patent: Jun. 16, 2026

(54) DISTRIBUTED SENSING FOR AUGMENTED REALITY HEADSETS

(71) Applicant: Meta Platforms Technologies, LLC, Menlo Park, CA (US)

(72) Inventors: Michael Goesele, Woodinville, WA (US); Richard Andrew Newcombe, Seattle, WA (US); Yujia Chen, Redmond, WA (US); Florian Eddy Robert Ilg, Kirkland, WA (US); Daniel Andersen, Redmond, WA (US); Chao Li, Woodinville, WA (US); Simon Gareth Green, Deptford (GB)

(73) Assignee: Meta Platforms Technologies, LLC, Menlo Park, CA (US)

( * ) Notice: Subject to any disclaimer, the term of this patent is extended or adjusted under 35 U.S.C. 154(b) by 218 days.

(21) Appl. No.: 18/484,195

(22) Filed: Oct. 10, 2023

(65) Prior Publication Data

US 2024/0119609 A1     Apr. 11, 2024

Related U.S. Application Data

(60) Provisional application No. 63/378,904, filed on Oct. 10, 2022.

(51) Int. Cl.
| | |
|---|---|
| *G06T 7/292* | (2017.01) |
| *G06N 3/02* | (2006.01) |
| *G06T 7/246* | (2017.01) |

(52) U.S. Cl.
CPC .............. *G06T 7/292* (2017.01); *G06N 3/02* (2013.01); *G06T 7/246* (2017.01)

(58) Field of Classification Search
CPC ...... G06N 3/02; G06N 3/0442; G06N 3/0455; G06N 3/0464; G06N 3/084; G06N 3/09;
(Continued)

(56) References Cited

U.S. PATENT DOCUMENTS

| | | | |
|---|---|---|---|
| 9,060,142 B2 | 6/2015 | Venkataraman et al. | |
| 9,342,873 B1 | 5/2016 | Barron | |
| | (Continued) | | |

OTHER PUBLICATIONS

Yuming Jiang et al., "Robust Reference-Based Super-Resolution via C2-Matching," Jun. 2021, Proceedings of the IEEE/CVF Conference on Computer Vision and Pattern Recognition (CVPR), 2021, pp. 2103-2107.*

(Continued)

*Primary Examiner* — Omar S Ismail
(74) *Attorney, Agent, or Firm* — Greenberg Traurig, LLP

(57) ABSTRACT

A distributed imaging system for augmented reality devices is disclosed. The system includes a computing module in communication with a plurality of spatially distributed sensing devices. The computing module is configured to process input images from the sensing devices based on performing a local feature matching computation to generate corresponding first output images. The computing module is further configured to process the input images based on performing an optical flow correspondence computation to generate corresponding second output images. The computing module is further configured to computationally combine first and second output images to generate third output images.

20 Claims, 27 Drawing Sheets

(58) Field of Classification Search

CPC ....... G06T 3/4038; G06T 7/246; G06T 7/292; G06V 20/20

See application file for complete search history.

(56) References Cited

U.S. PATENT DOCUMENTS

| | | | |
|---|---|---|---|
| 9,860,441 B1 | 1/2018 | Barron et al. | |
| 11,611,705 B1 * | 3/2023 | Chen | H04N 23/69 |
| 11,638,061 B1 * | 4/2023 | Sharma | G06F 3/04815 |
| | | | 725/38 |
| 12,039,695 B1 | 7/2024 | Jiang et al. | |
| 2012/0113209 A1 * | 5/2012 | Ritchey | G06F 3/015 |
| | | | 348/14.02 |
| 2015/0338204 A1 * | 11/2015 | Richert | G06T 7/593 |
| | | | 348/135 |
| 2015/0339826 A1 * | 11/2015 | Buibas | G06V 20/17 |
| | | | 901/1 |
| 2016/0014426 A1 * | 1/2016 | Richert | G06T 7/579 |
| | | | 375/240.16 |
| 2016/0314624 A1 * | 10/2016 | Li | G06F 3/012 |
| 2018/0074332 A1 * | 3/2018 | Li | G06F 3/012 |
| 2019/0011921 A1 * | 1/2019 | Wang | G05D 1/0094 |
| 2019/0220002 A1 * | 7/2019 | Huang | H04N 13/156 |
| 2019/0259108 A1 * | 8/2019 | Bongartz | G06Q 10/063 |
| 2019/0340799 A1 * | 11/2019 | Dryer | G06F 3/011 |
| 2019/0370994 A1 * | 12/2019 | Norris | G06V 20/20 |
| 2020/0020165 A1 * | 1/2020 | Tran | G06N 3/0464 |
| 2020/0066030 A1 * | 2/2020 | Naik | G06T 19/006 |
| 2020/0184153 A1 * | 6/2020 | Bongartz | A01G 9/249 |
| 2020/0186695 A1 * | 6/2020 | Helweg-Larsen | H04N 23/62 |
| 2020/0284883 A1 * | 9/2020 | Ferreira | G01S 7/4815 |
| 2020/0394012 A1 * | 12/2020 | Wright, Jr. | G06F 3/005 |
| 2021/0051274 A1 * | 2/2021 | Shanmugam | H04R 1/406 |
| 2021/0304291 A1 * | 9/2021 | Aggarwal | G06Q 30/0633 |
| 2021/0342974 A1 | 11/2021 | Zhang et al. | |
| 2022/0012920 A1 * | 1/2022 | Beith | G08B 3/10 |
| 2022/0014723 A1 * | 1/2022 | Pandey | G06T 5/60 |
| 2022/0021847 A1 * | 1/2022 | Maggiore | G06F 21/6218 |
| 2022/0035439 A1 * | 2/2022 | Holland | G06V 20/20 |
| 2022/0035508 A1 * | 2/2022 | Holland | G06F 3/011 |
| 2022/0067878 A1 * | 3/2022 | Zhao | G06T 11/00 |
| 2022/0070431 A1 * | 3/2022 | Sydorenko | G06F 3/011 |
| 2022/0335637 A1 | 10/2022 | Price et al. | |
| 2023/0171456 A1 * | 6/2023 | Sharma | G06T 11/00 |
| | | | 725/38 |
| 2023/0186512 A1 * | 6/2023 | Kim | G06V 40/11 |
| | | | 382/103 |
| 2023/0260240 A1 * | 8/2023 | Jayaram | H04N 13/243 |
| 2023/0360227 A1 * | 11/2023 | Holmes | H04N 19/577 |
| 2024/0119609 A1 * | 4/2024 | Goesele | G06N 3/02 |
| 2024/0312146 A1 * | 9/2024 | Park | G02B 27/0172 |
| 2024/0312147 A1 * | 9/2024 | Park | G06V 10/761 |
| 2024/0312150 A1 * | 9/2024 | Park | G06F 3/011 |
| 2024/0312248 A1 * | 9/2024 | Park | G06T 3/4092 |
| 2025/0045873 A1 * | 2/2025 | Kundu | H04N 5/2226 |

OTHER PUBLICATIONS

H. Siegl et al., "An augmented reality human-computer interface for object localization in a cognitive vision system," Dec. 3, 2007, Image and Vision Computing 25 (2007), pp. 1895-1901.*

Goutam Bhat et al.,"Deep Burst Super-Resolution," Jun. 2021, Proceedings of the IEEE/CVF Conference on Computer Vision and Pattern Recognition (CVPR), 2021, pp. 9209-9216.*

Youngrae Kim et al.,"Efficient Reference based Video SuperResolution (ERVSR): Single Reference Image Is All You Need," Jan. 2023, Proceedings of the IEEE/CVF Winter Conference on Applications of Computer Vision (WACV), 2023, pp. 1828-1834.*

Lik-Hang Lee et al., "Towards Augmented Reality Driven Human-City Interaction: Current Research on Mobile Headsets and Future Challenges," Oct. 2021, ACM Computing Surveys, vol. 54, No. 8, Article 165, pp. 165: 1-165:20.*

G. A. Koulieris et al., "Near-Eye Display and Tracking Technologies for Virtual and Augmented Reality," Jun. 7, 2019, Computer Graphics forum, vol. 38 (2019), No. 2, pp. 493-506.*

Lik-Hang Lee et al., "Towards Augmented Reality Driven Human-City Interaction: Current Research on Mobile Headsets and Future Challenges," Oct. 2021, ACM Computing Surveys, vol. 54, No. 8, Article 165, p. 165:1-165:20.*

Karen Simonyan et al., "Very Deep Convolutional Networks for Large-Scale Image Recognition," Apr. 10, 2015, Computer Vision and Pattern Recognition, arXiv:1409.1556v6, Published as a conference paper at ICLR 2015, pp. 1-5.*

Yuming Jiang et al., "Reference-Based Image and Video Super-Resolution via C2-Matching, " Jun. 5, 2023, IEEE Transactions On Pattern Analysis and Machine Intelligence, vol. 45, No. 7, Jul. 2, p. 8874-8880.*

Bandhav Veluri et al., "NeuriCam: Video Super-Resolution and Colorization Using Key Frames," Jul. 25, 2022, arXiv:2207. 12496v1, pp. 1-11.*

Adam Markman et al., "Augmented reality three-dimensional object visualization and recognition with axially distributed sensing," Jan. 8, 2016, Optics Letters, vol. 41, No. 2, Jan. 15, 2016, pp. 297-300.*

Mihai Dusmanu et al., "D2-Net: A Trainable CNN for Joint Description and Detection of Local Features," Jun. 2019, Proceedings of the IEEE/CVF Conference on Computer Vision and Pattern Recognition (CVPR), 2019, pp. 8092-8098.*

Bhat; et al., "Deep Burst Super-Resolution," Proceedings of the IEEE/CVF Conference on Computer Vision and Pattern Recognition, Jun. 2021, pp. 9209-9218.

Dusmanu; et al., "D2-Net: A Trainable CNN for Joint Description and Detection of Local Features," Proceedings of the IEEE/CVF Conference on Computer Vision and Pattern Recognition (CVPR), Jun. 2019, pp. 8092-8101.

Jiang; et al., "Reference-Based Image and Video Super-Resolution via C2-Matching," arXiv:2212.09581v2 [cs.CV], Mar. 19, 2023, Retrieved from the Internet: URL: https://doi.org/10.48550/arXiv. 2212.09581, 14 pages.

Jiang; "Robust Reference-Based Super-Resolution via C2-Matching," Proceedings of the IEEE/CVF Conference on Computer Vision and Pattern Recognition, Jun. 2021, pp. 2103-2112.

Kim; et al., "Efficient Reference-Based Video Super-Resolution (ERVSR): Single Reference Image is all You Need," Proceedings of the IEEE/CVF Winter Conference on Applications of Computer Vision (WACV), Jan. 2023, pp. 1828-1837.

Simonyan; et al., "Very Deep Convolutional Networks for Large-Scale Image Recognition," International Conference on Learning Representations 2015, Apr. 10, 2015, 14 pages.

Teed; et al., "RAFT: Recurrent All-Pairs Field Transforms for Optical Flow," In Computer Vision—ECCV 2020—16th European Conference, Proceedings, Part II, Aug. 23-28, 2020, 17 pages.

Veluri; et al., "NeuriCam: Video Super-Resolution and Colorization Using Key Frames," arXiv:2207.12496, Jul. 25, 2022, 17 pages.

Zhang; et al., "Image Super-Resolution by Neural Texture Transfer," Proceedings of the IEEE/CVF conference on computer vision and pattern recognition, Jun. 2019, pp. 7982-7991.

Kopf; et al., "Image-Based Rendering in the Gradient Domain," ACM Transactions on Graphics, Nov. 1, 2013, vol. 32, No. 06, 9 pages, Retrieved from the Internet: URL: https://dl.acm.org/doi/abs/ 10.1145/2508363.2508369.

* cited by examiner

Distributed Camera
Array for AR Systems

Single Camera System

530

540-3

540-4

540-5

540-8

540-9

540-2

540-1

540-6

540-7

500

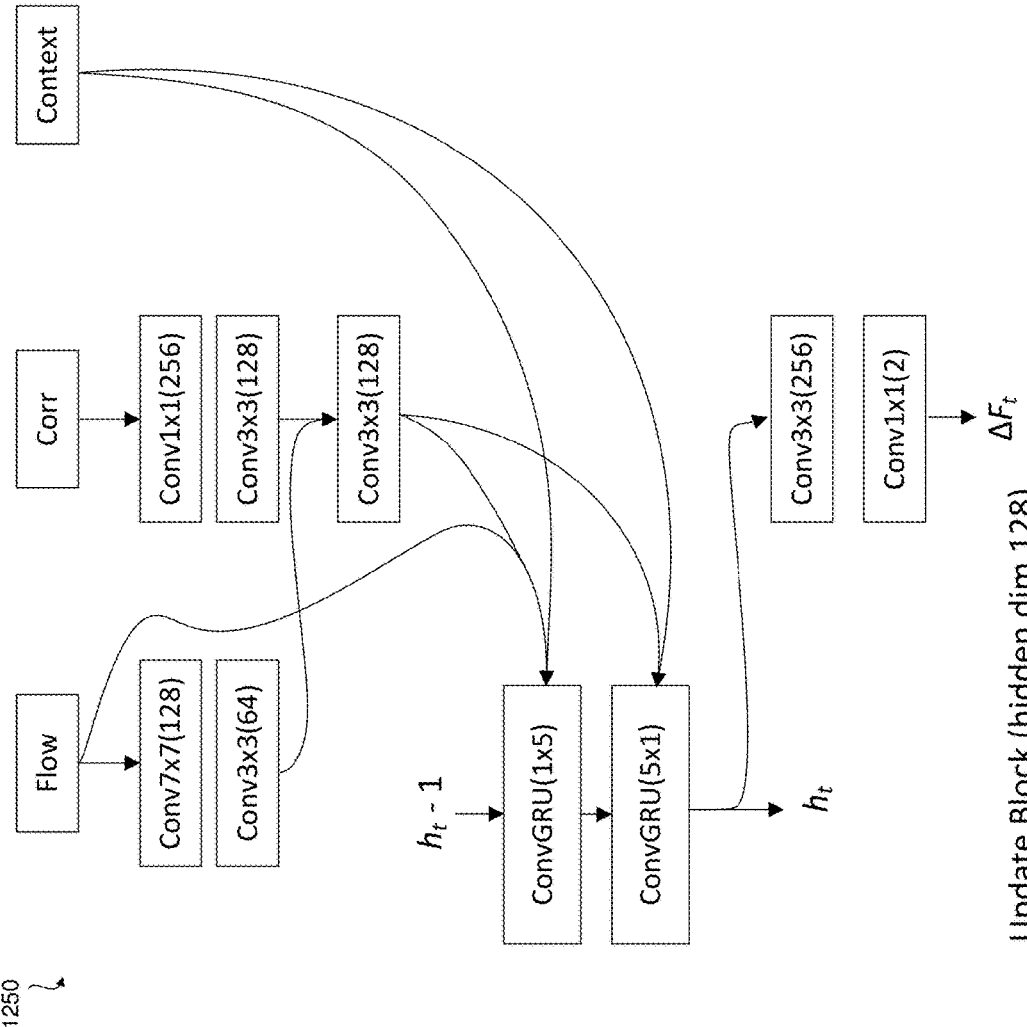
Update Block (hidden dim 128)
FIG. 12
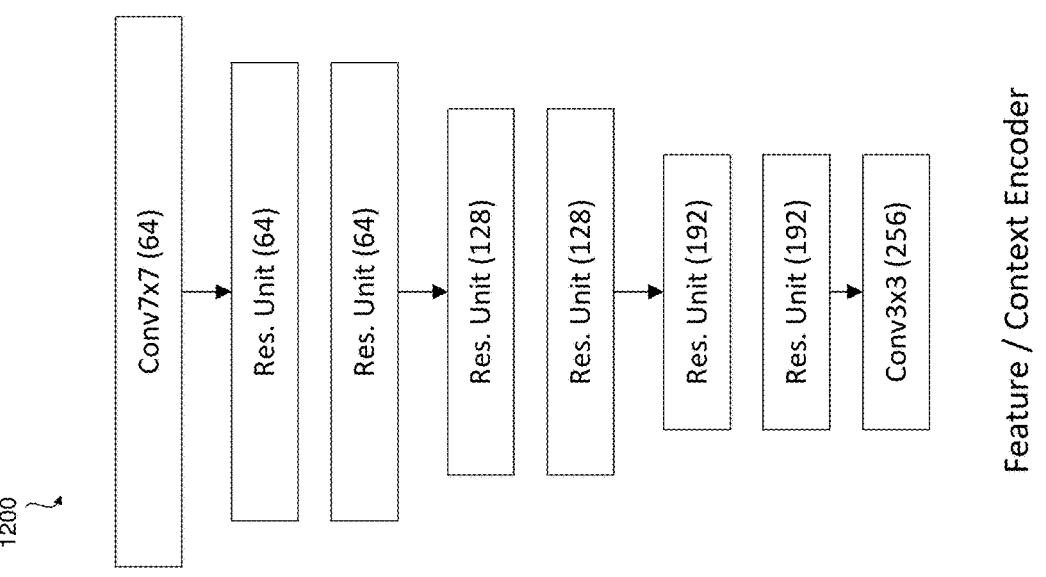
Feature / Context Encoder

DISTRIBUTED SENSING FOR AUGMENTED REALITY HEADSETS

PRIORITY

This application claims the benefit under 35 U.S.C. § 119(e) of U.S. Provisional Patent Application No. 63/378,904, filed 10 Oct. 2022, which is incorporated herein by reference.

TECHNICAL FIELD

This disclosure generally relates to using distributed sensing in augmented reality systems, and particularly to imaging using multiple cameras in augmented reality applications.

BACKGROUND

Augmented Reality (AR) systems and devices can include always-on devices designed to work with object-centric or three-dimensional maps of the world. Design considerations for AR sensing systems can include various classes of constraints to balance, such as computational speed, bandwidth, latency, memory requirements, which can limit the boundaries of sensing, processing, and/or interpretation abilities of the system. Power consumption and/or heat generation considerations can significantly limit design options, particularly for wearable devices and/or battery-operated subsystems. Sensing systems for AR, which can comprise cameras, thermal sensors, microphones, and/or accelerometers, may therefore need to balance power and efficiency requirement trade-offs with increasingly sophisticated sensing and demanding processing and output performance requirements.

Additionally, physical considerations can affect AR system design based on impact to appearance, size, volume, and/or weight. Industrial design and aesthetic considerations can drive AR sensing systems and their components, such as provided on wearable devices such as headsets or glasses, to be minimally visible, thereby adding further trade-offs and technical challenges to the design process. For example, selection criteria for determining numbers, types, sizes, and spatial distributions of cameras on AR glasses can be affected by these considerations.

There are continuous efforts to improve approaches to designing sensing and computational hardware, along with sophisticated methodologies for capture and processing of sensor data, to optimally meet these requirements in light of the constraints.

SUMMARY

In particular embodiments, which may combine the features of some or all of the above embodiments, a distributed imaging system for augmented reality devices is disclosed, the system including: a computing module; a plurality of spatially distributed sensing devices in communication with the computing module, the plurality of sensing devices integrated in a frame of Augmented Reality glasses and further including: a first sensing device configured to acquire a sequence of first images, each first image including a first field of view; and one or more second sensing devices, each second sensing device configured to be selectively activated to acquire one or more second images, each second image respectively including a second field of view, wherein the respective second field of view of each second image is smaller than the first field of view; wherein the computing module is configured to: process, based on performing a local feature matching computation, one or more input images acquired by the first sensing device and one or more of the second sensing devices to generate a first output image; process, based on performing an optical flow correspondence computation, the one or more input images to generate a second output image set including one or more second output images; and computationally combine the first output image and the second output image set to generate a third output image having a resolution higher than a corresponding first image acquired by the first sensing device.

In particular embodiments, which may combine the features of some or all of the above embodiments, the computing module includes one or more computing devices. In particular embodiments, which may combine the features of some or all of the above embodiments, at least a subset of the plurality of sensing devices is disposed on a wearable device, the wearable device configured to be worn by a user.

In particular embodiments, which may combine the features of some or all of the above embodiments, for generating the first output image, the computing module is configured to: acquire, based on operating the first sensing device, a first image associated with a scene; acquire, based on operating one or more of the second sensing devices, one or more second images, wherein each second image corresponds to a respective portion of the scene; generate a scaled first image based on resampling the first image; generate a composite second image including one or more of the second images; generate, for each of the composite second image and the scaled first image, a respective correspondence feature map, each correspondence feature map generated by a neural network encoder; determine, based on computing a correlation map between the respective correspondence feature maps of the composite second image and the scaled first image, a pixel-wise correspondence between the composite second image and the scaled first image; generate, for each of the composite second image and the scaled first image, a respective content feature map; combine, based on the determined pixel-wise correspondence, the respective content feature maps of the composite second image and the scaled first image into a composite feature map; and generate, based on decoding the composite feature map, the first output image associated with the scene, the decoding performed using a neural network decoder, the first output image having a higher resolution than the first image.

In particular embodiments, which may combine the features of some or all of the above embodiments, generating the composite image is based on an application of epipolar constraints, or wherein determining the pixel-wise correspondence is based on an application of epipolar constraints to correlation scores of the correlation map, the epipolar constraints applied based on identifying corresponding epipolar lines in a plurality of the scaled first image and the one or more of the second images. In particular embodiments, which may combine the features of some or all of the above embodiments, the neural network decoder is trained based on respective imaging parameters of one or more of the plurality of sensing devices. In particular embodiments, which may combine the features of some or all of the above embodiments, at least a portion of the scene captured by a second sensing device spatially overlaps with the scene associated with the first image, and wherein at least a first portion of the scene captured by a first device of the second sensing devices spatially overlaps with at least a second portion of the scene captured by a second device of the second sensing devices.

In particular embodiments, which may combine the features of some or all of the above embodiments, the sequence of first images is acquired by the first sensing device at a first sampling rate, and wherein a sequence of second images is acquired by the second sensing devices at a second sampling rate lower than the first sampling rate. In particular embodiments, which may combine the features of some or all of the above embodiments, an image capture triggering event of one of the plurality of second sensing devices is offset in time from an image capture triggering event of another of the plurality of second sensing devices. In particular embodiments, which may combine the features of some or all of the above embodiments, a burst sequence of a plurality of second images is acquired by a second sensing device in a burst mode, wherein the sampling rate for the burst sequence is equal to or higher than the first sampling rate.

In particular embodiments, which may combine the features of some or all of the above embodiments, for generating the one or more second output images, the computing module is configured to: acquire, based on operating the first sensing device, a first image associated with a scene; acquire, based on operating one or more of the second sensing devices, one or more second images, wherein each second image corresponds to a respective portion of the scene; generate a scaled first image based on resampling the first image; determine, based on comparing each second image to the scaled first image, a respective region of interest corresponding to each second image and a first optical flow; generate a context feature map associated with the scaled first image; generate, corresponding to the scaled first image, a first feature map, and corresponding to each second image, a respective second feature map; determine, based on computing correlations between the first feature map and each of the second features maps, a multi-level correlation set; compute, based on context feature map, the first optical flow, and the multi-level correlation set, an incremental optical flow, wherein the first optical flow is updated with the computed incremental optical flow; iterating, based on one or more convergence criteria, the computation of the incremental optical flow and the corresponding updating of the first optical flow to obtain a converged optical flow; and generate, based on the converged optical flow, the one or more second output images associated with the scene, each of the second output images having a higher resolution than the first image.

In particular embodiments, which may combine the features of some or all of the above embodiments, the multi-level correlation set is weighed based on application of epipolar constraints, the epipolar constraints applied based on identifying corresponding epipolar lines in a plurality of the scaled first image and the one or more of the second images. In particular embodiments, which may combine the features of some or all of the above embodiments, the computed incremental optical flow is constrained prior to updating the first optical flow based on application of epipolar constraints, the epipolar constraints applied based on identifying corresponding epipolar lines in a plurality of the scaled first image and the one or more of the second images. In particular embodiments, which may combine the features of some or all of the above embodiments, determining the respective regions of interest is based on determining a homography transformation set including each transformation between the scaled first image and a respective second image of the one or more second images, and wherein the first optical flow is determined based on the homography transformation set.

In particular embodiments, which may combine the features of some or all of the above embodiments, for computationally combining the first output image and the second output image set, the computing module is configured to: acquire, based on operating the first sensing device, a first image associated with a scene; acquire, based on operating one or more of the second sensing devices, one or more second images, wherein each second image corresponds to a respective portion of the scene; generate a scaled first image based on resampling the first image; generate, based on processing the input images including the first image and the one or more second images, the first output image and the one or more second output images; generate, based on respective application of a degradation filter to the first output image and each of the one or more second output images, a set of degraded output images; extract, based on processing the scaled first image, the first output image, and each of the second output images by a first neural network encoder, a first set of encoded features; extract, based on processing the first image and each of the set of degraded output images by a second neural network encoder, a second set of encoded features; determine, based on processing the second set of encoded features by one or more neural networks, a normalized set of attention weights; determine, based on the attention weights and the first set of encoded features, a set of fused features; and generate, based on decoding the set of fused features, the third output image associated with the scene, the decoding performed using a neural network decoder, the third output image having a higher resolution than the first image.

In particular embodiments, which may combine the features of some or all of the above embodiments, an image resolution of each degraded output image is equal to an image resolution of the first image. In particular embodiments, which may combine the features of some or all of the above embodiments, the sequence of first images is acquired by the first sensing device at a first sampling rate, and wherein a sequence of second images is acquired by the second sensing devices at a second sampling rate lower than the first sampling rate. In particular embodiments, which may combine the features of some or all of the above embodiments, one or more of a video mode or a burst mode is activated for one or more of the plurality of sensing devices prior to computationally combining the first output image and the second output image set, to capture a plurality of denoising images, the denoising images processed to reduce a respective noise level of one or more images of the first output image and the second output image set. In particular embodiments, which may combine the features of some or all of the above embodiments, an attention-based network is used for processing the denoising images.

In particular embodiments, which may combine the features of some or all of the above embodiments, a computer-implemented method for implementing distributed imaging for augmented reality device is disclosed, the method including: acquiring, by a first sensing device of a plurality of spatially distributed sensing devices integrated in a frame of Augmented Reality glasses, a sequence of first images, each first image including a first field of view; acquiring, by one or more second sensing devices of the plurality of spatially distributed sensing devices, one or more second images, each second image respectively including a respective second field of view, wherein the respective second field of view of each second image is smaller than the first field of view; processing, by one or more computing devices in communication with the plurality of spatially distributed sensing devices and based on performing a local feature matching computation, one or more input images acquired by the first sensing device and one or more of the second sensing devices to generate a first output image; processing, by one or more of the computing devices and based on performing an optical flow correspondence computation, the one or more input images to generate a second output image set including one or more second output images; and computationally combining, by one or more of the computing devices, the first output image and the second output image set to generate a third output image having a resolution higher than a corresponding first image acquired by the first sensing device.

BRIEF DESCRIPTION OF THE DRAWINGS

FIG. 12 illustrates an exemplary neural network architecture for image reconstruction, according to particular embodiments.

DESCRIPTION OF EXAMPLE EMBODIMENTS

Figure 1:
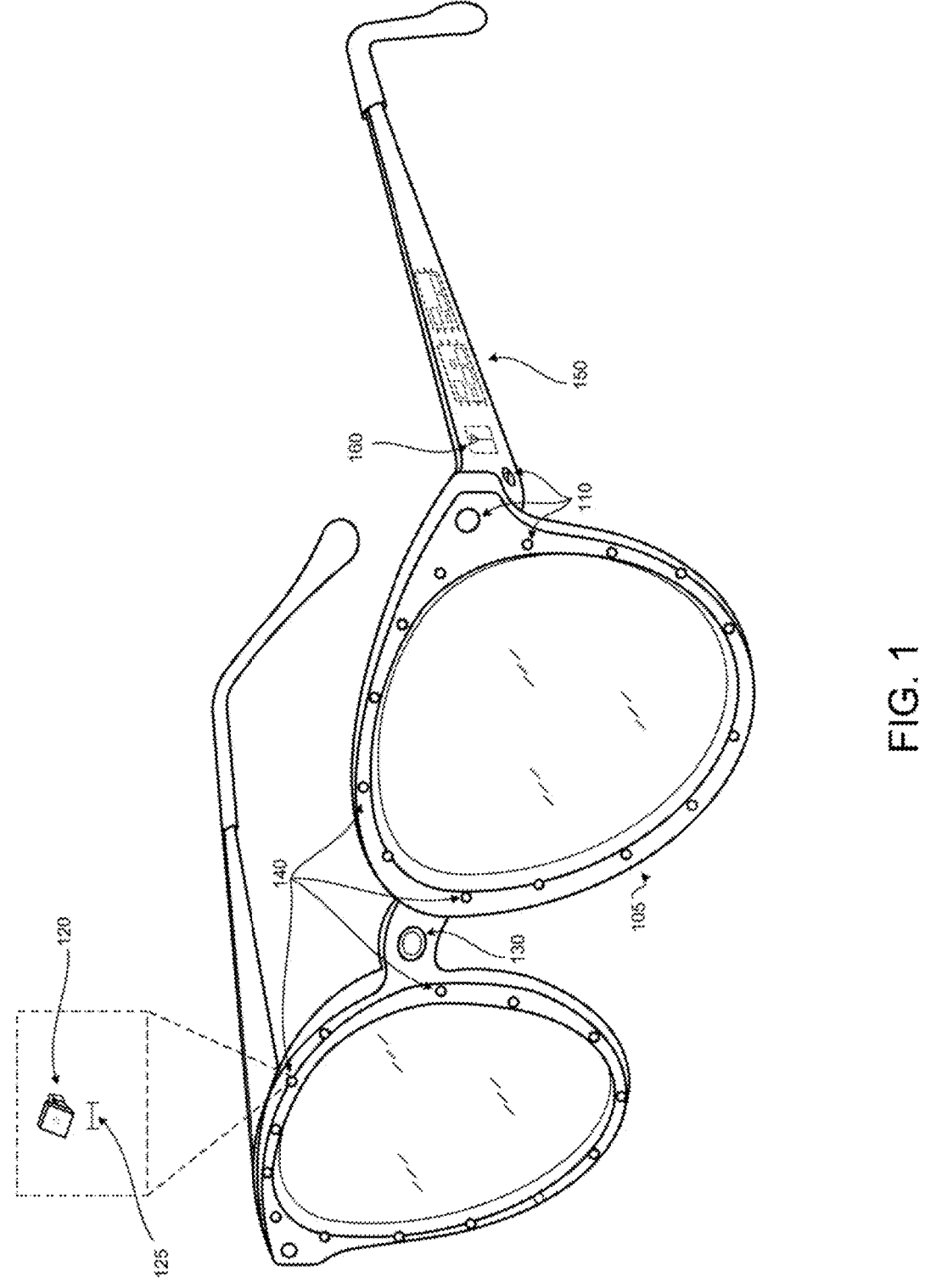
FIG. 1 illustrates a schematic example of AR glasses depicting multiple distributed cameras, according to particular embodiments.

In particular embodiments, in AR devices such as headsets or glasses, an image sensing stack and associated processing may require a significant amount of power, which may contradict power requirements for always-on object-centric or three-dimensional maps. Furthermore, in particular embodiments, it may be desirable from an industrial design point of view for cameras on AR headsets or glasses to be "invisible" and not impact any design considerations. By way of example and not limitation, this may lead to a push to minimize both the number and size of cameras on future devices, as well as the time during which cameras are actually turned on.

In particular embodiments, it may be desirable to distribute sensing capabilities from a single, high resolution camera to multiple cameras. By way of example and not limitation, each of the multiple cameras may have a lower resolution and/or smaller footprint than a single, high resolution camera, while still meeting the performance requirements of headsets. By way of example and not limitation, distributing sensing to multiple cameras may permit selectively activating one, or a subset, or all of the multiple cameras, leading to a camera level sparse-sensing approach, wherein capturing and/or processing less data can reduce the power and thermal footprint of the system. Separately or additionally, in particular embodiments, a distributed sensing approach can be combined with complementary pixel-level sparse sensing to lead to further significant savings in power consumption and/or heat generation. In particular embodiments, selective capture and other sensing modalities can be used to enhance privacy.

In particular embodiments, a headset-mounted distributed sensing system may be equipped with a plurality of cameras each comprising one or more image sensors, wherein the system may be configured to utilize multiple cameras to provide high quality output image and/or video capture. In particular embodiments, the system may be configured to utilize multiple cameras to perform AR-related functions with a reduced power requirement, higher performance, and/or added functionality, than using conventional single camera configurations, and/or using multiple cameras without exploiting particular synergies of distributed sensing, as will be described further herein. By way of example and not limitation, distributed sensing may be used for improved performance for object tracking, Visual-Inertial Odometry (VIO), and/or Simultaneous Location and Mapping (SLAM), as well as imaging applications other than visible light.

By way of example and not limitation, improvements (such as "high quality" output) obtained by distributed sensing in AR applications may refer to an output having a higher resolution than the corresponding individual input image and/or video resolution(s) respectively captured by each of the plurality of cameras. By way of example and not limitation, improvements (such as "high quality" output) obtained by distributed sensing may additionally or alternatively refer to an output having lower noise, higher dynamic range, higher signal-to-noise ratio (SNR), fewer distortions, artifacts, or any combination of these and other aspects, than each of the corresponding individual image and/or video inputs respectively obtained by each of the plurality of cameras. In particular embodiments, a high quality image may be reconstructed using the images captured by the plurality of cameras using super-resolution methods and/or image merging techniques.

In particular embodiments, one or more user-wearable devices such as AR headsets (and/or glasses, wherein the terms may be interchangeably used herein) may be equipped with multiple types of cameras. By way of example and not limitation, an AR headset may comprise (a) a relatively fewer number (such as one) of a relatively wider field-of-view (FoV) guide, or reference, camera; and (b) a relative plurality of (such as three, five, or nine) of relatively narrower field-of-view (FoV) detail cameras. Herein, "wider" and "narrower" are used as mutually relative terms, and are not limiting or necessarily indicative of the respective absolute fields-of-view of the guide camera(s) or detail cameras. By way of example and not limitation, a guide camera may have a FoV of 68°×53°.

As used herein, the terms "guide" and "detail" for the respective camera(s) are not to be construed as limiting for interpretating any characteristics thereof, unless specifically attributed herein.

In particular embodiments, a guide camera may be configured as a low angular resolution camera. By way of example and not limitation, a guide camera may comprise a 1 Megapixel sensor, or an 800×600 pixel sensor. In particular embodiments, a guide camera may be an RGB or a grayscale camera. In particular embodiments, a guide camera may be capable of a still photography mode and/or a video mode. In particular embodiments, a guide camera may be capable of a burst mode, wherein a rapid sequence of still images can be selectively acquired in a respective burst instance, and wherein a burst sequence may be optionally followed by a configurable rest period without image acquisition.

In particular embodiments, a set of detail cameras may be used. By way of example and not limitation, a set may comprise three, or five, or nine detail cameras, or a different number. By way of example and not limitation, each detail camera may be configured as a high angular resolution camera, which angular resolution of the detail camera may be equal to, or greater than an angular resolution of one or more corresponding guide cameras. In particular embodiments, an angular resolution of one or more detail cameras may be less than that of a guide camera. By way of example and not limitation, a sum of the sensor pixel counts of the detail cameras may exceed the sensor pixel count of a corresponding guide camera. In particular embodiments, a sum of combined sensor pixel counts of multiple detail cameras, and/or an effective angular resolution or resolution obtained based on combining input images from multiple detail cameras, may be greater than the corresponding quantities obtained based on image capture by a guide camera alone.

In particular embodiments, a partial set of the total pixels of an imaging sensor of the guide camera and/or one or more detail cameras may be selectively activated for performing any of the operations and methods disclosed herein.

By way of example and not limitation, each detail camera may have a smaller or narrower FoV than that of a corresponding guide camera. By way of example and not limitation, a detail camera may have a FoV of 29°×22°. By way of example and not limitation, each detail camera may comprise a 1 Megapixel sensor, or a 640×480 pixel sensor. In particular embodiments, a detail camera may be an RGB or a grayscale camera. In particular embodiments, a detail camera may be capable of a stills or still photography mode and/or a video mode. In particular embodiments, a detail camera may be capable of a burst mode, wherein a rapid sequence of still images can be selectively acquired in a respective burst instance, and wherein a burst sequence may be optionally followed by a configurable inactive or rest period, i.e., without image acquisition.

FIG. 1 illustrates a schematic example of AR glasses depicting multiple distributed cameras, according to particular embodiments. By way of example and not limitation, AR glasses 100 may comprise a frame 105, and distributed sensors 110 spatially embedded at different structural parts of AR glasses 100, such as integrated within frame 105. By way of example and not limitation, sensors 110 may include cameras, acoustic sensors, and/or remote sensing modules. As illustrated by way of example and not limitation, each embedded camera may have a controllable imaging sensor 120, which may be sensitive within and/or outside the visible range of the electromagnetic spectrum. In particular embodiments, an imaging sensor 120 suitable for integration with AR glasses 100 may have a relatively small size, and as such, may be subject to physics-based constraints based on sensor size, diffraction limits, and/or thermal dissipation challenges. In particular embodiments, imaging sensor 120 may be associated with a characteristic length scale 125. By way of example and not limitation, a characteristic length scale 125 of particular embodiments of imaging sensors suitable for integration within AR glasses may be O(1 mm), i.e., of millimeter scale.

In particular embodiments, AR glasses 100 may comprise one or more guide cameras, such as guide camera 130, and one or more detail cameras 140, such as 140-1, 140-2, 140-3, and so on (for clarity, a partially labeled set is illustrated in FIG. 1). By way of example and not limitation, AR glasses 100 may comprise fewer guide cameras 130 than detail cameras 140. By way of example and not limitation, a guide camera 130 may be relatively centrally located on AR glasses 100. By way of example and not limitation, a guide camera may have a larger exposed or visible appearance than a detail camera. By way of example and not limitation, a larger visible appearance of a guide camera may be based on a larger front element requirement for a wider FoV than that of each detail camera.

In particular embodiments, AR glasses 100 may be in communication with, and/or may comprise one or more computer systems 2100, and/or parts thereof. In particular embodiments, AR glasses 100 may comprise a processing module 150. By way of example and not limitation, processing module 150 may be comprise one or more on-device processor and/or pre-processors. In particular embodiments, parts of processing module 150 may optimized for performing specialized functions. In particular embodiments, processing module 150 may be optimized for low power consumption. In particular embodiments, processing module 150 may be optimized for distributed processing. By way of example and not limitation, AR glasses 100 may be configured to process one or more particular sensor data streams, and/or performing encoding tasks, on-device via one or more dedicated components of processing module 150. By way of example and not limitation, AR glasses 100 may be configured to transmit or otherwise offload particular tasks for off-device processing, such as particular tasks that may be highly computationally intensive, and/or particular tasks or applications that may have a lower sensitivity to latency. In particular embodiments, processing module 150 may be functionally, structurally, and/or operationally compatible with, interoperable with, replaceable by, and/or substantially equivalent to one or more instances of processor 2102 of computer system 2100.

In particular embodiments, AR glasses 100 may comprise a communications module 160. By way of example and not limitation, communications module 160 may configured for communicatively coupling AR glasses 100 to one or more external devices, networks, and/or systems. By way of example and not limitation, communications module 160 may comprise one or more wired connections and/or wireless network interfaces, antennas, modules for connecting to one or more of an off-device module of an AR system of AR glasses 100, local networks (e.g., Wi-Fi, Bluetooth), cellular networks (e.g., 5G or 6G), and/or satellite-based networks (e.g., GPS), among others. In particular embodiments, communications module 160 may be functionally, structurally, and/or operationally compatible with, interoperable with, replaceable by, and/or substantially equivalent to communication interface 2110 of computer system 2100.

Figure 2B:
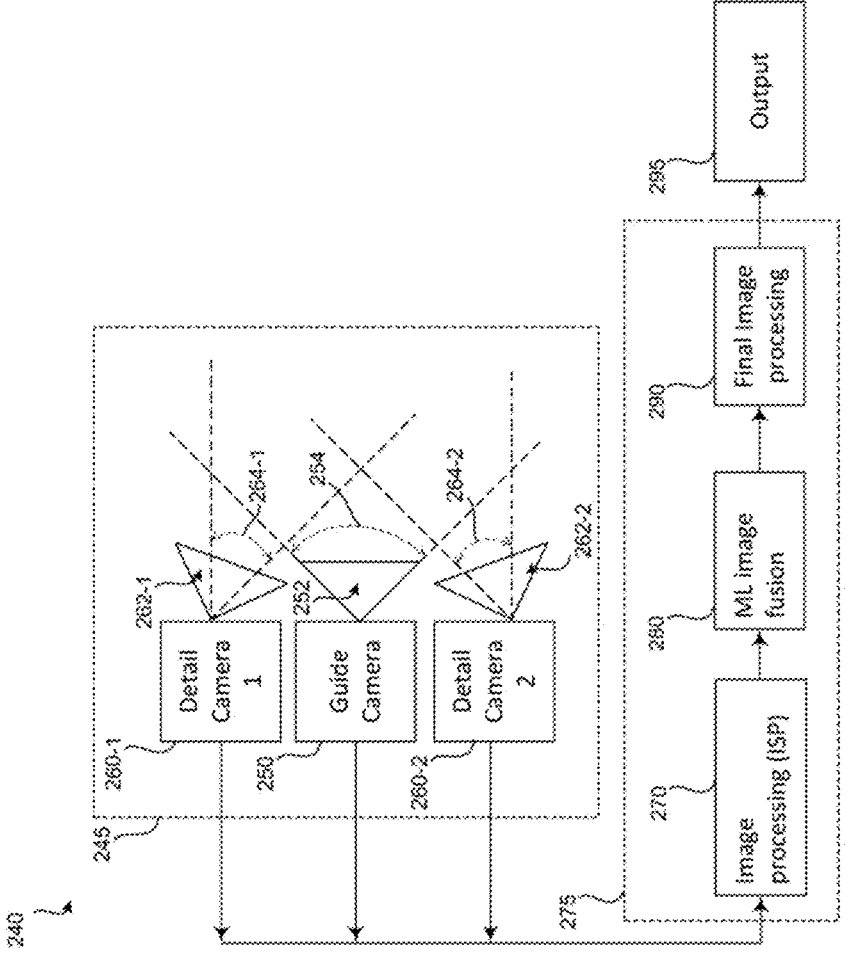
FIGS. 2A-2B illustrate schematic overviews, respectively, of a conventional single camera system and a distributed camera system, according to particular embodiments.
Figure 2A:
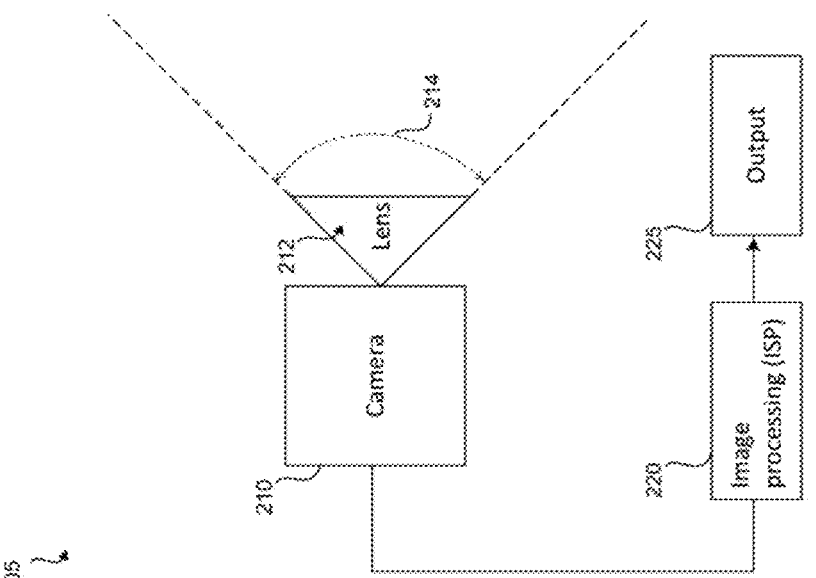

FIGS. 2A-2B illustrates schematic overviews, respectively, of a conventional single camera system and a distributed camera system, according to particular embodiments. A conventional single camera system 205 comprises a single camera 210. In particular embodiments, single camera system 205 may be configured to produce, as output, relatively high resolution images or video based on sampling via the single camera 210. In particular embodiments, single camera system 205 may comprise a lens 212. Single camera system 205 may be configured to image a Field of View (FoV) 214. By way of example and not limitation, FoV 214 of single camera system 205 may be a large or wide FoV. FIG. 2A illustrates a one-dimensional representation of FoV 214.

As used herein, the term "lens" may refer to an optical assembly for imaging that may, in particular embodiments, comprise a plurality of individual lens elements.

In particular embodiments, single camera system 205 may comprise an image processing (ISP) module 220 for processing an output of a sensor of single camera 210, and/or for generating a final output 225. In particular embodiments, output 225 may comprise one or more high resolution images, low noise images, and/or high dynamic range images. In particular embodiments, output 225 may be additionally or alternatively comprise a video capture. By way of example and not limitation, ISP module 220 may be configured to perform one or more of demosaicing or debayering, colorspace conversion, and/or correction, noise reduction, avoidance and/or removal of color artifacts, image scaling, and/or image compression.

In contrast to single camera system 205, a distributed camera system 240 may comprise, in particular embodiments, a camera array 245, and/or additional processing modules or steps, for producing a final output 295. In particular embodiments, output 295 of distributed camera system 240 may comprise one or more high resolution images, low noise images, and/or high dynamic range images. In particular embodiments, output 295 may be additionally or alternatively comprise a video capture.

A distributed camera system 240, as described herein, may comprise a camera array 245. In particular embodiments, camera array 245 may comprise a guide camera 250, and one or more detail cameras 260. In particular embodiments, camera array 245 may comprise one or more additional guide cameras 250 (not shown). As illustrated in the non-limiting example of FIG. 2B, camera array 245 may comprise multiple detail cameras, such as two detail cameras, 260-1 and 260-2. By way of example and not limitation, particular configurations may comprise 2×2=4 detail cameras 260, or 3×3=9 detail cameras 260.

By way of example and not limitation, an optional arrangement of camera array 245 implemented on AR glasses 100 may comprise an approximately horizontal row of detail cameras 260 such as spanning the width of the frame of AR glasses 100, for example having 15 cm between the leftmost and the rightmost detail cameras 260 in the row. Continuing by way of non-limiting example. guide camera 250 may be placed at the center of this row, such as about 2 cm above or below the row. By way of example and not limitation, an alternate arrangement of camera array 245 on AR glasses 100 may include placing one or more of the cameras along the ring of each glasses lens of AR glasses 100. By way of example and not limitation, groups of cameras of camera array 245 may be clustered in one or multiple areas of the glasses. In particular embodiments, an exact placement of the cameras may determine an amount of overlap that may be achieved between them, and/or may be needed to ensure a full coverage over the relevant depth range without gaps in the detail images from detail cameras 260.

In particular embodiments, a guide camera 250 may comprise a lens 252, and may cover an imaging FoV 254. In particular embodiments, detail cameras 260-1 and 260-2 may respectively comprise lenses 262-1 and 262-2, and may cover respective imaging FoVs of 264-1 and 264-2. In particular embodiments, FoVs of one or more detail cameras 260 may be narrower than an FoV of guide camera 250. In particular embodiments, detail cameras 260 may be positioned and/or oriented such that each detail camera (for example, 260-1 and 260-2) has a Region of Interest (RoI) that may cover a portion of the view of guide camera 250. In particular embodiments, each detail camera 260, such as 260-1 and 260-2, may be positioned and/or oriented such that a combination of the respective Regions of Interest (RoI) of the detail cameras 260, such as 260-1 and 260-2, may be used as input in methods described herein to provide the view captured by guide camera 250 via output 295. In particular embodiments, output 295 corresponding to a view of guide camera 250 may be generated by recreating, reconstructing, restoring, and/or otherwise processing the respective images captured by the detail cameras 260, such as by 260-1 and 260-2, of camera array 245.

In particular embodiments, a Region of Interest (RoI) may refer to a subset and/or portion of a larger scene or view. By way of example and not limitation, a Region of Interest (RoI) may comprise a subset of a number or zone of spatially distributed visual elements of a scene or view, and/or a narrower FoV portion of a wider FoV scene or view. By way of example and not limitation, one or more Regions of Interest (RoI) of an overall scene or view may be considered or defined prior to, during, and/or after application of any processing, corrections, and/or compensations, such as based on relative camera positions, perspectives, poses, relative temporal instant of image acquisition, camera motion, subject motion, optical aberrations, and/or any other processing or factors.

In particular embodiments, a grid may be overlaid over the view of guide camera 250, and each of the detail cameras 260 may be rotated or otherwise oriented so that their respective center pixels, for example, may intersect with a center pixel of the corresponding 3×3 grid cell.

In particular embodiments, a grid of detail cameras 260 may be overlaid over the FoV of guide camera 250, so that for a given minimum depth, the respective FoVs of the detail cameras 260 may jointly cover an FoV of detail camera 250. By way of example and not limitation, such joint coverage may not leave missing overlaps and/or unsampled gaps in particular embodiments. By way of example and not limitation, such joint coverage may be associated with producing one or more gaps in particular embodiments, such as depicted by reference 340 in FIG. 3B. In particular embodiments, a missing overlap and/or unsampled gap may be filled in by super resolution methods applied to one or more low resolution images, such as that of guide camera 250.

Figure 3B:
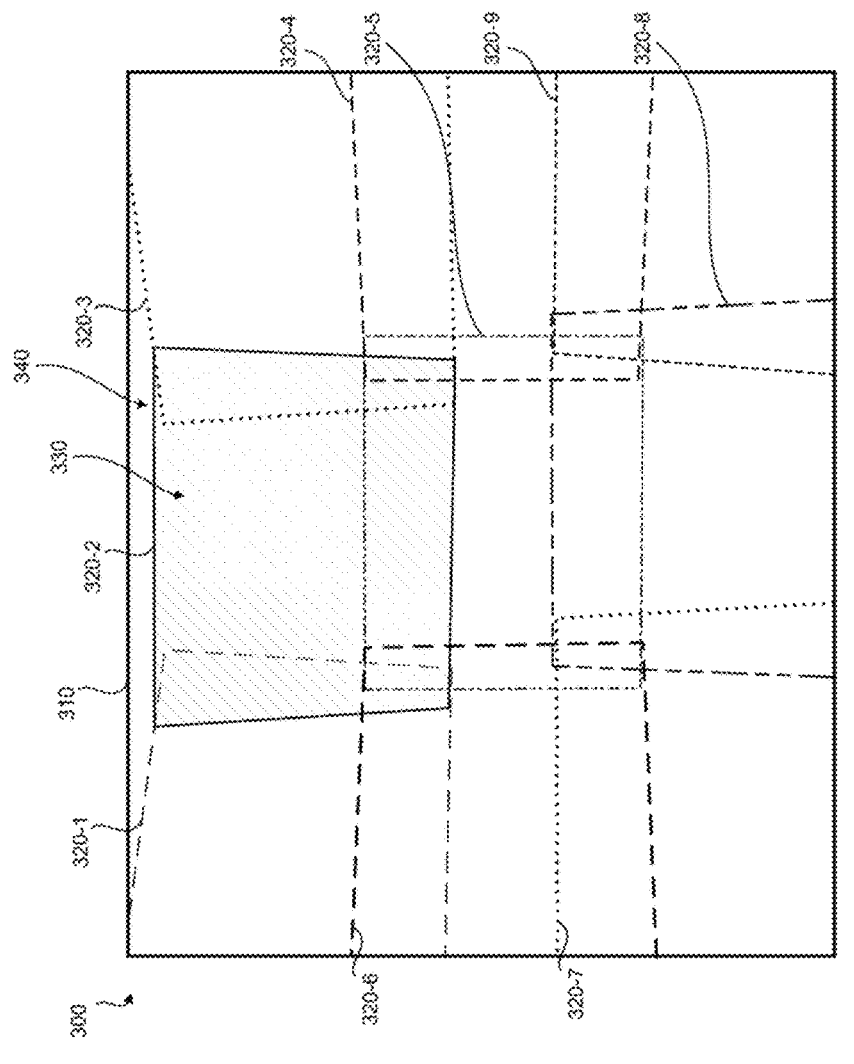
FIGS. 3A-3B illustrate schematic visualizations of overlapping of detail camera views relative to a guide camera view, according to particular embodiments.
Figure 3A:
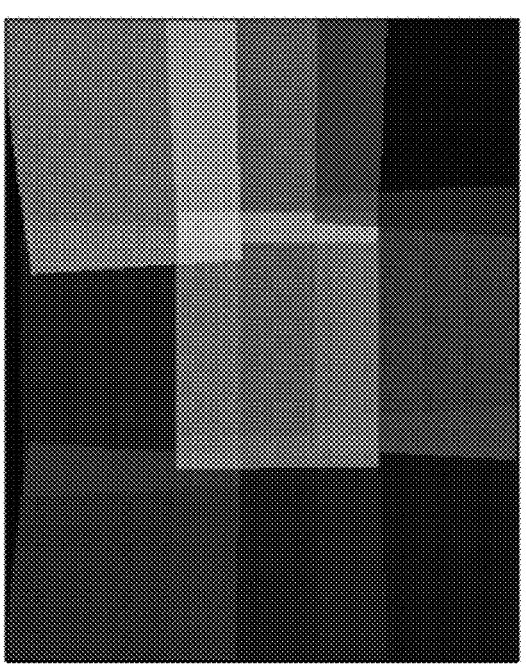

FIGS. 3A-3B illustrate matched schematic visualizations 300 of overlapping of detail camera views relative to a guide camera view, according to particular embodiments. Particular features are illustrated with respect to only FIG. 3B for clarity, but may equally apply to the corresponding grid of FIG. 3A. A guide camera view or guide camera RoI 310 corresponding to a guide camera 250 includes overlapping sections of detail camera RoI 320 (e.g., 320-1 through 320-9) overlaid on guide camera RoI 310, and corresponding to an arrangement of 3×3=9 detail cameras 260. For clarity, each detail camera RoI 320 is indicated in FIG. 3B at a respective boundary of that detail camera RoI 320. As each of the detail cameras 260 may be rotated or otherwise oriented so that its center pixel, for example, may intersect with the center pixel of the corresponding 3×3 grid cell, each overlapping detail camera RoI 320 is no longer rectangular, or a rectilinear polygon, as illustrated by shaded representation 330 of detail camera RoI 320-2. In particular embodiments, portions of one or more detail camera RoI 320 may be cropped to provide a particular form of an output image, and/or corresponding to guide camera RoI 310. In particular embodiments, as seen by 340, there may be portions of guide camera RoI 310, as selected, that may not be sampled by any of the detail cameras 260 provided.

By way of example and not limitation, for a distributed camera system 240 implemented on a AR glasses 100 wherein each of one guide camera 250 and 3×3=9 detail cameras 260 comprise a 1 Megapixel sensor, the detail images captured by the detail cameras 260 may be used to reconstruct a high-resolution image (approximately 9 Megapixels) with an approximate total view of the guide camera 250. In particular embodiments, a final output of the distributed camera system may be considered to be a composite image, and/or a processed composite image, of multiple images captured by a distributed set of cameras. In particular embodiments, a composite image, and/or a processed composite image may be reconstructed from images acquired at the same instant in time, and/or at different instants in time.

In particular embodiments, generating output 295 may comprise one or more of processing or pre-processing the respective sensor outputs from camera array 245 via an image processing (ISP) module 270; recreating, reconstructing, restoring, and/or otherwise processing a plurality of images captured by camera array 245 in a Machine Learning image fusion module 280; and/or final image processing in a final image processing module 290, for generating output 295. Particular methods and/or processes for generating output 295, some of which will be described further herein, may be provided by one, or a combination of, image processing module 270, Machine Learning image fusion module 280, and/or final image processing module 290, collectively referred to as the image processing pipeline 275. In particular embodiments, image processing pipeline 275 may perform specialized functions, such as fusion, super-resolution, and/or machine-learning based denoising. In particular embodiments, image processing pipeline 275 may interoperate with other on-device and/or off-device modules, such as for distributed processing by specialized processors and/or off-device processors, wherein "device" refers to a physical or wearable structure of the AR glasses 100.

Additional to specialized functions, operations, and benefits particular to distributed camera systems, such as discussed here, other functions and operations performed by one or more elements of image processing pipeline 275 may be identical or substantially similar to those performed by an image processing module 220 of a single camera system 205, such as debayering or final image compression.

In particular embodiments, each camera of camera array 245 may be communicatively coupled such that their respective sensor exposures may be triggered simultaneously, and/or such that a sensor exposure timestamp of each camera of distributed camera system 240 can be expressed in a common time domain. By way of example and not limitation, this synchronizability can permit camera array 245 to capture a set of all guide images from guide camera 250 and all detail images from detail cameras 260 at the same moment in time. By way of example and not limitation, this synchronizability can permit distributed camera system 240 to capture frames sparsely, so that, a fusion process performed by machine learning image fusion module 280 may use detail frames captured in the past, while also knowing the pose of the detail cameras 260 at the time the frames were captured.

In particular embodiments, a camera calibration process may be performed. By way of example and not limitation, during camera calibration, the cameras of camera array 245, i.e., each guide camera 250 and all detail cameras 260, jointly observe a suitable test target, wherein a calibration set of images is captured showing the test target. In particular embodiments, one or more camera parameters and/or camera calibration data may be derived based on these calibration images. By way of example and not limitation, a camera calibration may be performed in a preprocessing step, such as during a factory process, or it may be performed when the user uses the device. In particular embodiments, a camera calibration may be performed and/or updated continuously based on online calibration. By way of example and not limitation, online calibration may be based on data obtained from device tracking components (SLAM, VIO), and/or at specific instances in time based on a calibration procedure.

In particular embodiments, an epipolar line may be computed based on knowing calibration data for the cameras. By way of example and not limitation, to obtain epipolar constraints, given any pixel from a first image, a depth range of the scene to capture (such as 0.5 m to 100 m), and particular parameters of sensing devices (such as calibration data obtained by camera calibration), a curve along which the aforementioned pixel of interest may lie may be computed, the curve forming a corresponding epipolar constraint. As described herein, epipolar constraints may be used to constrain the correspondence location of the given pixel between images based on locating corresponding pixels and/or other features of interest. In particular embodiments, based on such knowledge of camera and inter-camera characteristics, as described herein, an application of hard and/or soft constraints based on epipolar constraints may be used to reduce computational complexity and compute requirements, for example, by constraining search spaces for machine learning models to follow neighborhoods of epipolar lines rather than search more globally.

In particular embodiments, distributed camera system 240 may be configured such that each camera of camera array 245 may transfer frames to a common execution environment, such as for training and/or inferential use for fusion and/or super-resolution applications. By way of example and not limitation, fusion and/or super-resolution operations for an exemplary distributed camera system 240 may occur on-device, such as on AR glasses 100 comprising a camera array 245 as well as suitable onboard computing capability (e.g., based on processing module 150), or off-device (e.g., by a computer system 2100 communicatively coupled to AR glasses 100, which computer system 2100 may be optionally GPU-enabled).

In particular embodiments, an angular resolution and/or depth of field obtained each camera of camera array 245 may be fundamental physical constraints, such as the diffraction limit, as well as design and manufacturing constraints. In particular embodiments, an overall form factor and the minimum viable pixel size may limit the pixel resolution achievable by each individual small-scale camera. In particular embodiments, particular methods and/or processes for generating output 295, as described herein, may overcome such and other optical and/or sensor limitations.

In particular embodiments, one or more of the images (and/or video) captured by the camera array 245 may comprise low resolution images, some or all of which may be processed and/or combined to provide one or more high resolution (HR) images as output 295, such as by super-resolution (SR) methods, and/or low noise images as output 295, and/or high dynamic range images as output 295. In particular embodiments, one or more cameras of camera array 245 may capture video, and/or rapid burst sequences of still images. In particular embodiments, output 295 may be additionally or alternatively comprise a video capture, which may be enhanced in terms of resolution, noise characteristics, dynamic range, a relative absence of artifacts, and/or other visual or imaging aspects. In particular embodiments, output 295 may be suitable for consumer photography and/or videography in AR applications. In particular embodiments, a selectively sampled output from one or more cameras of camera array 245 may be suitable for use in particular Augmented Reality use cases, such as object tracking, Visual-Inertial Odometry (VIO), and/or Simultaneous Location and Mapping (SLAM). In particular embodiments, output 295 may be obtained with one or more relative benefits of sparse sensing, low power requirements and heat generation, and distributed processing optionality, such as off-device processing for computationally intensive tasks, extents of which benefits may be customizable to particular AR applications or use cases, while permitting a smaller visual and packaging footprint relative to a comparable camera system for a desired output quality and type.

By way of example and not limitation, a computational distribution of processing may comprise transferring all raw pixels after capture by camera array 245, and resuming all processing in an off-device computation resource, such as a cloud server, a dedicated processing station, and/or a companion computing device, such as a mobile phone. By way of example and not limitation, preliminary processing in particular embodiments may be performed on AR glasses 100, such as one or more encoder stages, and/or obtaining a feature space representation of the data, and then transferring the feature representation to an off-device computational resource to complete the remaining processing requirements. In particular embodiments, hybrid and/or context based distribution of computing resources and tasks may be used for suitably balancing on-device computations and off-device computations.

In particular embodiments, AR glasses 100 may operate one or more guide cameras 250 and/or a plurality of detail cameras 260 according to specific methods for implementing Augmented Reality (AR) applications using distributed sensing. By way of example and not limitation, AR glasses 100 may be used for photography, such as high resolution photography, low light photography, high dynamic range photography and/or general purpose consumer photography. By way of example and not limitation, AR glasses 100 may be used for videography, and/or low light videography. By way of example and not limitation, AR glasses 100 may be used for implementing SLAM/VIO. By way of example and not limitation, AR glasses 100 may be used for implementing object tracking. By way of example and not limitation, AR glasses 100 may be used for reading and/or processing text and/or bar codes, such as QR codes.

As a non-limiting example of data processing, all raw pixel information from camera array 245 may be transferred following capture to an off-device computing resource, such as a cloud server or a mobile phone. As another non-limiting example of data processing, one or more initial pre-processing steps, such as demosaicing and encoding may be performed on-device on AR glasses 100, followed by transfer of the encoded features vectors off-device for further processing. As another non-limiting example of data processing, all processing steps for producing a final image output may be performed on-device on AR glasses 100.

Figure 4A:
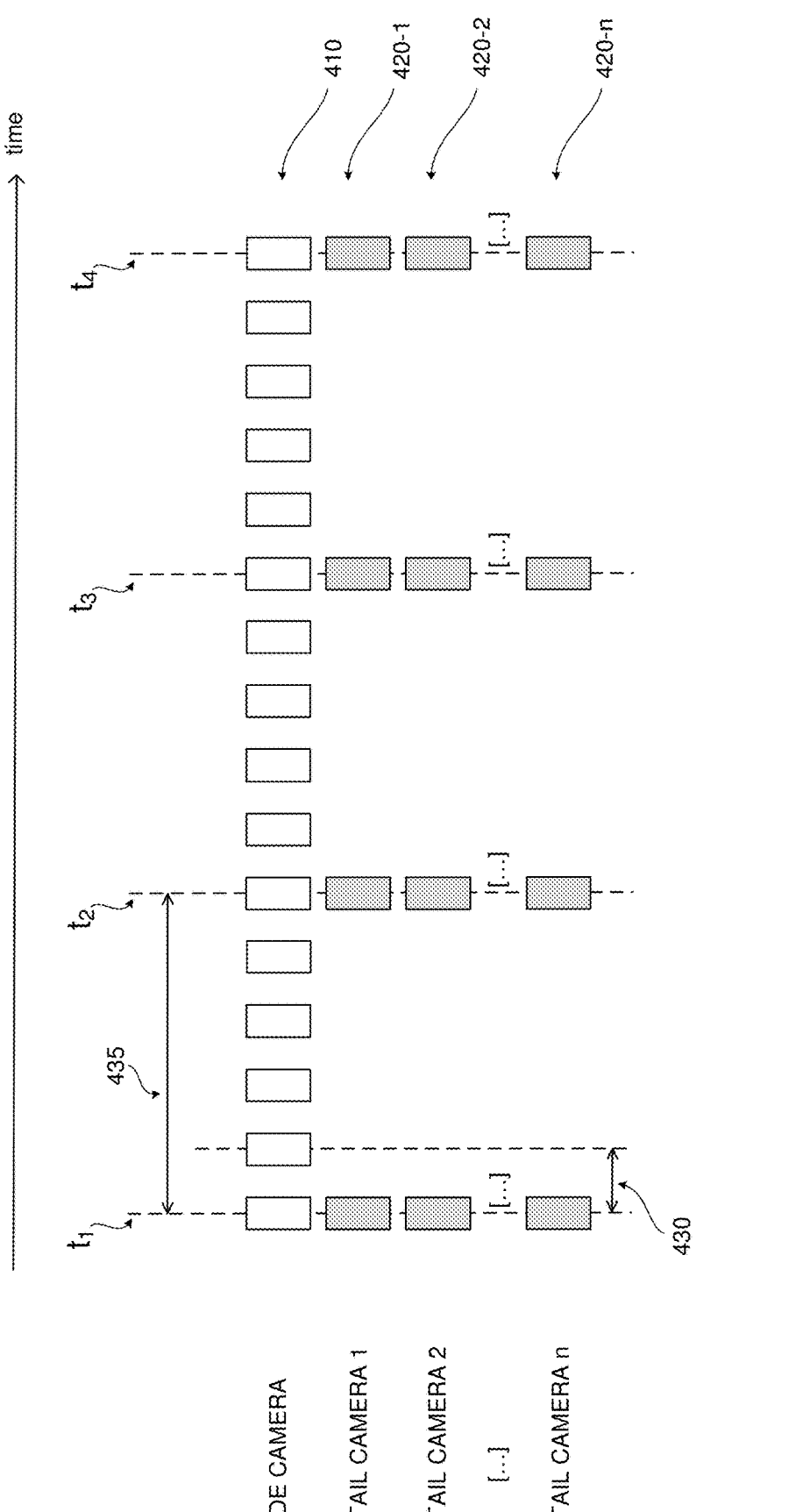
FIGS. 4A-4B illustrate schematics of sparse capture by detail cameras of a distributed camera system relative to a guide camera, according to particular embodiments.
Figure 4B:
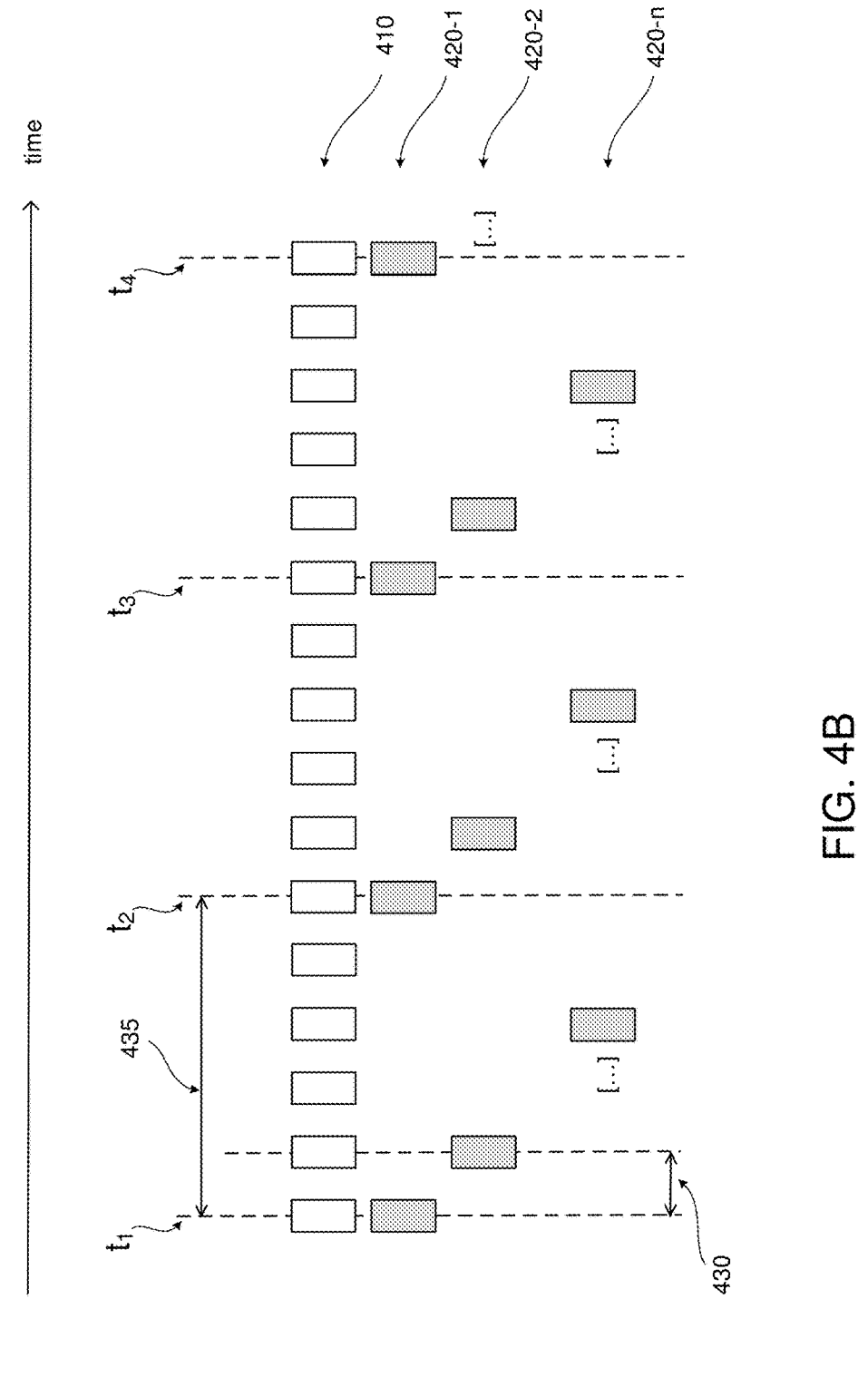
Figure 4C:
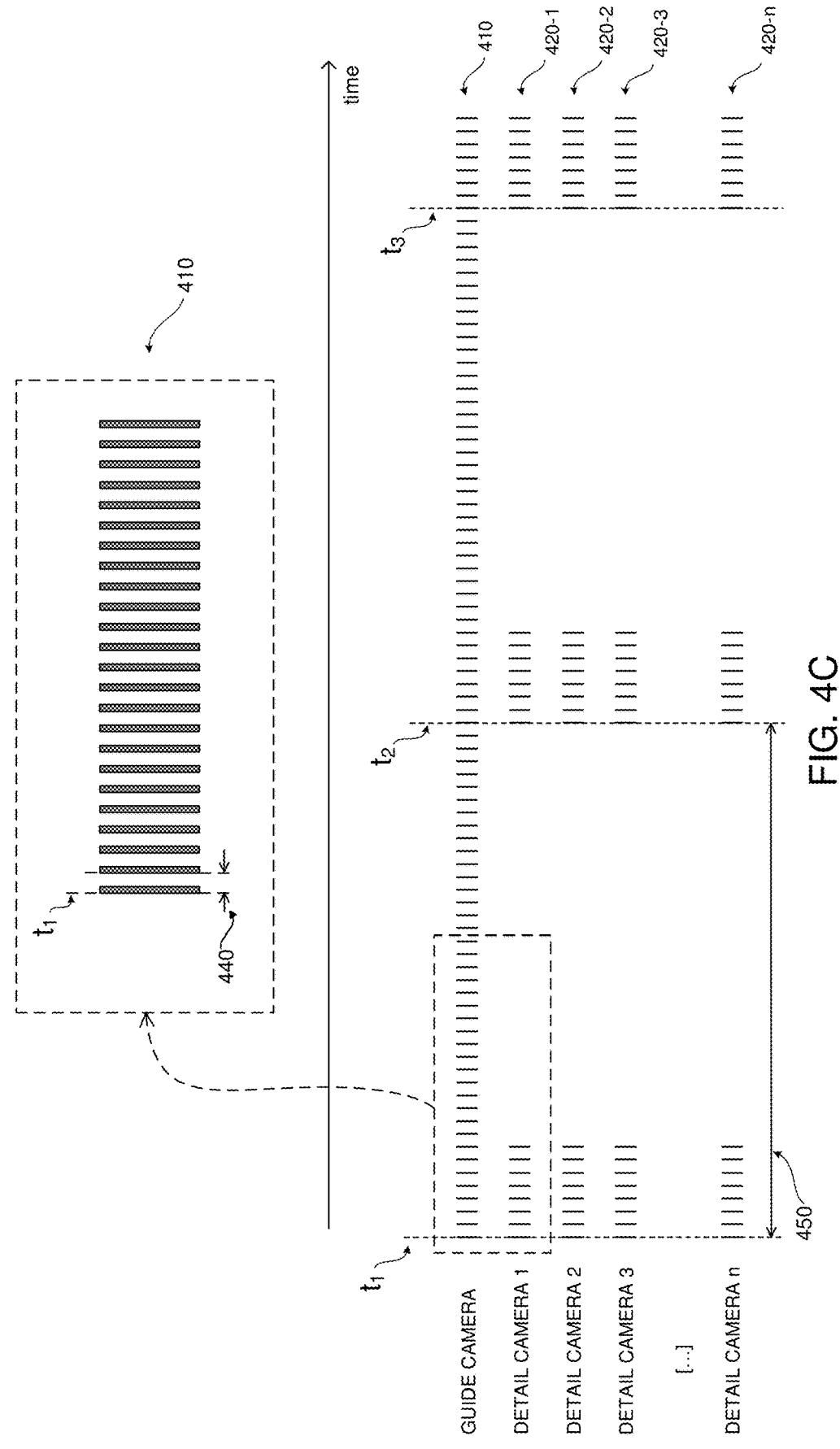
FIGS. 4C-4D illustrate schematics of integrating burst mode processing with sparse video capture, according to particular embodiments.
Figure 4D:
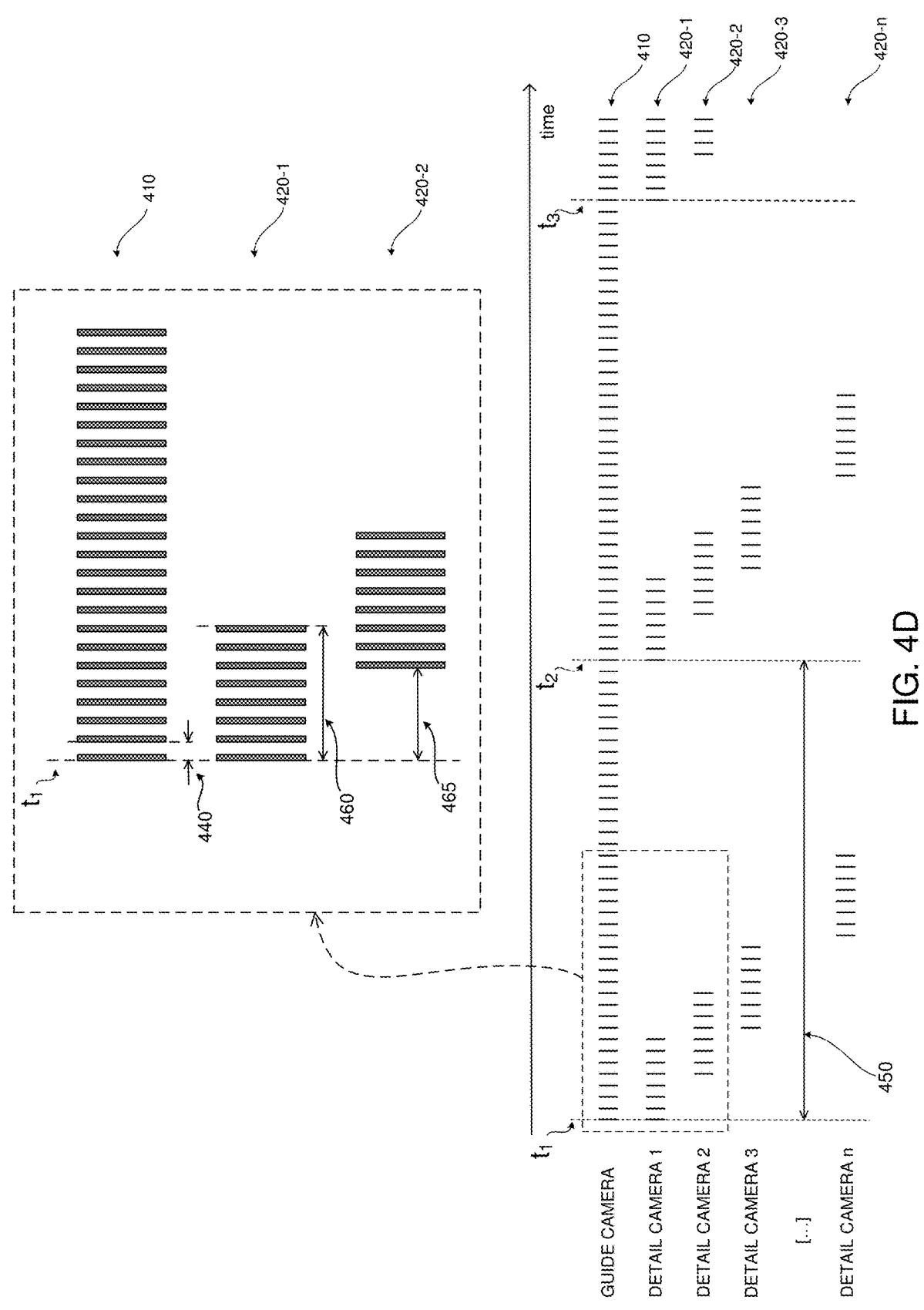

FIGS. 4A-4B illustrate schematics of sparse capture by detail cameras of a distributed camera system relative to a guide camera, according to particular embodiments. FIGS. 4C-4D illustrate schematics of integrating burst mode processing with sparse video capture, according to particular embodiments.

By way of example and not limitation, AR glasses 100 may be used for high resolution and/or general consumer photography. In particular embodiments, several or all cameras of camera array 245 may be simultaneously triggered or activated to capture respective images at the same instant in time.

By way of example and not limitation, AR glasses 100 may be used for high resolution and/or general-purpose consumer videography. In particular embodiments, several or all cameras of camera array 245 may be used for implementing videography. By way of example and not limitation, a capture stream 410 by guide camera 250 may be operated with a particular frame rate, such as corresponding to guide camera sampling time scale 430 schematically illustrated in FIG. 4A. In particular embodiments, use of image reconstruction, regeneration, and/or other methods disclosed herein may permit capture streams of detail cameras 260, such as 420-1, 420-2, through an n-th detail camera used 420-$n$, to be operated with a particular frame rate lower than that of the guide camera. By way of example and not limitation, as illustrated in FIG. 4A, a frame rate for each of the detail cameras 460 may correspond to a detail camera sampling timescale 435. In particular embodiments, some of the detail cameras 260 may use a different frame rate than other(s) of the detail cameras 260. In particular embodiments, operating one or more detail cameras 260 at a reduced frame rate relative to guide camera 250, and/or the use of other sparse operational modes described herein, can provide significantly reduced power consumption, reduced heat generation, as well as reduced bandwidth and data storage requirements.

In particular embodiments, some or all cameras of camera array 245 may be synchronized. By way of example and not limitation, as illustrated in FIG. 4A, each of the detail cameras 260 in use for the application may be simultaneously triggered to capture synchronously with each of the remaining detail cameras 260 in use for the application, such as simultaneously triggering at time $t_1$, followed by simultaneously triggering at time $t_2$, followed by simultaneously triggering at time $t_3$, and so on.

In particular embodiments, one or more cameras of camera array 245 may be configured to trigger capture having an offset in time from one or more other cameras' triggering of capture. By way of example and not limitation, as illustrated in FIG. 4B, each of the detail cameras 260 in use for the application may be triggered to capture in a round-robin fashion. By way of example and not limitation, one or more of the detail cameras 260 may operate at a frame rate that may be lower than that of guide camera 250. By way of example and not limitation, a frame rate of any of the detail cameras 260 may be equal to, or different from, another of the detail cameras 260. By way of example and not limitation, a frame rate of any of the detail cameras 260 may be fixed or variable in time.

By way of example and not limitation, each triggering event for detail camera 2 may lag those of detail camera 1 by an offset, such as by a sampling time interval or timescale 430, or another suitable offset; in turn, each triggering event for detail camera 3 may lag those of detail camera 2 by an offset, such as by a sampling time interval or timescale 430, or another suitable offset; and so on for other detail cameras 260.

In particular embodiments, as illustrated by FIG. 4B, any particular capture from any of the detail cameras 260 may be synchronized with one or more captures from guide camera 250. In particular embodiments, any particular capture from any of the detail cameras 260 may be referenced or indexed to a most recent (i.e., just behind in time) capture from guide camera 250, a simultaneous capture from guide camera 250, a soonest upcoming (i.e., just ahead in time) capture from guide camera 250, and/or any suitable pre-determined or adaptive combination taken from the temporal neighborhood of captures from guide camera 250.

In particular embodiments, one or more detail cameras 260 may be selectively activated to capture on demand, and/or adaptively. By way of example and not limitation, one or more detail cameras 260 may be used to adaptively capture at additional frame rates, or at reduced frame rates, or be deactivated, depending on analysis of the ambient conditions and the sufficiency of captured data to reconstruct, generate, and/or otherwise provide a sufficiently high output quality of images, video, or other AR purpose. By way of example and not limitation, other AR purposes may include object tracking, and/or SLAM/VIO. By way of example and not limitation, it may be desirable in particular embodiments to acquire, using a large number of the cameras available in camera array 245 each sampling at a high frame rate, high resolution video of a fast-paced sporting event.

By way of example and not limitation, AR glasses 100 may be used for videography, such as high resolution videography, in low light conditions. In particular embodiments, several or all cameras of camera array 245 may be used for implementing videography. By way of example and not limitation, a capture stream 410 by guide camera 250 may be operated at a particular frame rate, such as corresponding to guide camera sampling timescale 440 schematically illustrated in FIG. 4C. By way of example and not limitation, guide camera 250 may be operated at 120 frames per second (fps).

In particular embodiments, as illustrated in FIGS. 4C and 4D, one or more of the detail cameras 260 may be operated in burst mode, wherein a burst or sequence of multiple images or frames may be captured in rapid succession. In particular embodiments, corresponding to sparse operation in burst mode, a given camera may operate in a burst mode by capturing a sequence of multiple images, followed by a rest or inactive time interval. In particular embodiments, a duty cycle comprising a ratio of activity time for image capture relative to a corresponding inactive time interval may be considered a sparsification target.

By way of example and not limitation, as illustrated by FIG. 4C, each of the detail cameras 260 may be configured to operate in a sparse burst mode, each burst comprising 8 consecutive frames taken synchronized with ongoing image capture by guide camera 250, and also with the detail cameras 260. By way of example and not limitation, as further illustrated by FIG. 4C, the detail cameras 260 may be operated with a sparsify target of 20%, or 0.2. Accordingly, for every 40 frames taken by guide camera 250 (e.g., at 120 fps), such as during a time interval indicated by 450, each of the detail cameras 260 may operate to capture a sequence of 8 frames, such as during a time interval indicated by 460 in FIG. 4D, and may then rest for the next 32 frames before activating again to acquire the next 8 frames in burst mode. That is, in this non-limiting example, during a given time interval, one or more detail cameras 260 may be configured to be activated for a fraction of that time interval, such as 20%, using a suitable frame rate when active.

It will be appreciated that one or more of the non-limiting examples provide may indicate equal frame rates for guide camera 250 and exemplary detail cameras 260 for providing an understanding. In particular embodiments, different frame rates between one or more detail cameras 260, and/or between particular or all detail cameras 260 and one or more guide cameras 250, are fully contemplated herein.

In particular embodiments, a starting of a burst event for a particular detail camera may lag or lead one or more such events corresponding respective to one or more other detail cameras 260. By way of example and not limitation, as illustrated in FIG. 4D, burst events for detail cameras 260 may be staggered in a round robin fashion. By way of example and not limitation, a starting of a burst sequence for detail camera 2 may lag the corresponding starting time of detail camera 1 by an offset, such as by time interval 465, or another suitable offset; in turn, a starting instant for a corresponding burst event for detail camera 3 may lag those of detail camera 2 by an offset, such as by an identical offset time interval 465, or by another suitable offset; and so on for other detail cameras 260.

In particular embodiments of data processing for low light conditions, an image reconstruction or fusion process may include a burst mode processing algorithm. By way of example and not limitation, a burst mode processing algorithm may use one or more frames based on burst mode acquisition by one or more cameras of camera array 245 for denoising purposes.

By way of example and not limitation, AR glasses 100 may be used for SLAM and/or VIO. In particular embodiments, only a guide camera 250 may be activated for SLAM/VIO use. In particular embodiments, a subset of the detail cameras 260 may be activated in synchronized or unsynchronized video capture. In particular embodiments, all of the detail cameras 260 may be activated in synchronized or unsynchronized video capture. By way of example and not limitation, guide camera 250 may be a wide FoV, low angular resolution camera. By way of example and not limitation, each of the detail cameras 260 used for SLAM/VIO may be a narrow FoV, high angular resolution camera. In particular embodiments, only guide camera 250 may activated, optionally along with a separate and/or dedicated SLAM camera in synchronized or unsynchronized video capture. In particular embodiments, one or more Inertial Measurement Units (IMUs) may be optionally added to improve a trajectory accuracy.

As non-limiting examples of data processing for SLAM and/or VIO applications, in particular embodiments, a SLAM algorithm may consume raw camera frames from one or more of camera array 245 and/or a SLAM camera without requiring additional data synthesis. In particular embodiments, a SLAM algorithm may be executed on-device on AR glasses 100, or off-device. In particular embodiments, a VIO system may integrate data from additional sensors than the set of imaging sensors of camera array 245, which set may optionally include IMUs.

In particular embodiments, in addition to localizing AR glasses 100 in the environment, a SLAM/VIO system may be used to provide a continuously updated calibration for the cameras of camera array 245, and for the distributed camera system 240. By way of example and not limitation, such a calibration may be intrinsic or extrinsic, and may include an online calibration.

By way of example and not limitation, AR glasses 100 may be used for object tracking. In particular embodiments, only a guide camera 250 may be activated for a video capture to support object tracking. In particular embodiments, some or all of detail cameras 260 may activated some (e.g., in sparse mode) or all of the time to support object tracking. By way of example and not limitation, activating criteria for detail cameras 260 may be adaptive to particular requirements, such as required accuracy, and/or a size of objects to be tracked. As non-limiting examples of data processing for object tracking, a tracking algorithm may be directly applied to a captured guide image stream, such as from guide camera 250, and/or other image streams from one or more additional cameras of camera array 245. The tracking algorithm may run on-device on AR glasses 100, or off-device.

By way of example and not limitation, AR glasses 100 may be used for reading text and/or barcodes, such as QR codes. In particular embodiments, only a guide camera 250 may be activated for coarse identification of a potential text block and/or QR code. Based on such identification, in particular embodiments, one or more of detail cameras 260 may be activated corresponding to a region of interest and/or detail level requirement. In particular embodiments, based on acquiring one or more images from corresponding ones of detail cameras 260, further algorithm(s) to read text and/or QR codes may be applied. As non-limiting examples of data processing for reading text and/or barcodes, an identification of text and/or barcodes, such as QR codes, may be performed on-device on AR glasses 100, such as based on processing low resolution images from guide camera 250. In particular embodiments, a detailed reading of a text block and QR codes, such as using high resolution images from one or more detail cameras 260, may occur both on-device on AR glasses 100, and/or off-device.

Figures 5A, 5B:
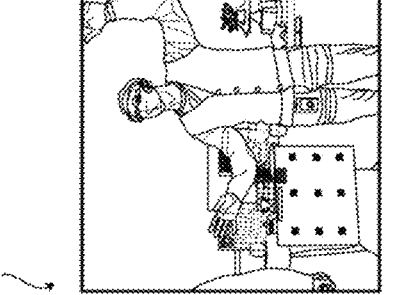
FIG. 5A illustrates a schematic guide camera input, according to particular embodiments.
FIG. 5B illustrates a schematic mosaic of multiple detail camera input images, according to particular embodiments.

FIG. 5A illustrates a schematic guide camera input 500, according to particular embodiments. By way of example and not limitation, guide camera input 500 may comprise a low resolution image of a given scene, as captured by guide camera 250. FIG. 5B illustrates a schematic mosaic 530 of multiple detail camera input images 540 (e.g., 540-1 through 540-9 for a non-limiting example of 3×3=9 detail cameras 260), according to particular embodiments. By way of example and not limitation, one or more of the detail camera input images 540 may be used for image reconstruction based on methods described herein. By way of example and not limitation, each of the detail camera input images 540 may be respectively captured by a detail camera such that overlapping areas of their Regions of Interest (RoIs) are captured, as illustrated in FIG. 5B.

Figures 6A, 6B:
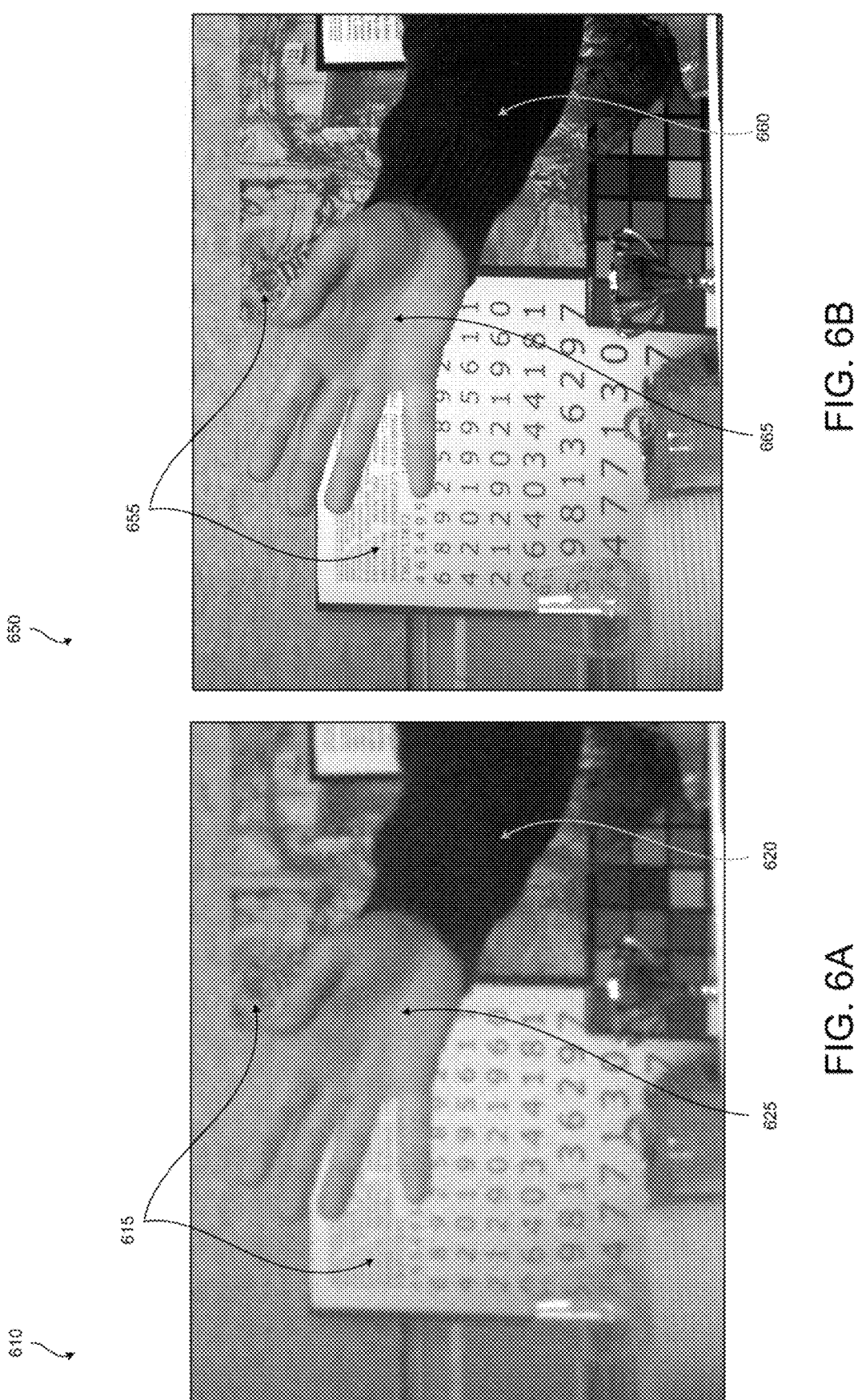
FIGS. 6A-6B illustrate schematic enlarged fragments, respectively, of a low angular resolution image and a corresponding high angular resolution image, according to particular embodiments.

FIGS. 6A and 6B illustrate schematic enlarged fragments, respectively, of a low angular resolution image 610 and a corresponding high angular resolution image 650, according to particular embodiments. By way of example and not limitation, low angular resolution image 610 may be a fragment of an image captured by guide camera 250. By way of example and not limitation, the corresponding high angular resolution image 650 of FIG. 6B, which depicts the same scene of FIG. 6A, may be a fragment of an image capture by a detail camera 260. By way of example and not limitation, a rendering of high frequency image content, such as text and fine image detail at 655, is noticeably improved in the FIG. 6B relative to the corresponding aspects of 615 in FIG. 6A.

It should appreciated that several desirable image quality attributes and improvements, such as seen in FIG. 6B relative to FIG. 6A, need not always include, and/or be limited to, a higher angular resolution. By way of example and not limitation, one or more of a color depth and/or tonal depth, noise or SNR levels, acutance, and/or dynamic range may be improved in FIG. 6B (i.e., captured by individual distributed detail cameras 260, for example) relative to FIG. 6A (i.e., captured by a guide camera 250, for example). By way of example and not limitation, a skin color and/or tone at 665 in FIG. 6B compares favorably to a corresponding skin color and/or tone at 625 in FIG. 6A. By way of example and not limitation, a level of noise, detail, texture, and/or discernable structure within the shadows at 660 in FIG. 6B compares favorably to the corresponding attributes and aspects at 620 in FIG. 6A.

Accordingly, as discussed herein, it can be beneficial to apply image reconstruction, restoration, fusion, and/or super resolution methods to optimally and seamlessly combine extracted from individual and/or overlapping images into a high quality, consistent image.

In particular embodiments, particular image processing and/or machine learning methods may be used to reconstruct or otherwise process multiple images acquired by a plurality of distributed cameras in augmented reality applications.

In particular embodiments, one or more neural networks, deep neural networks, and/or convolutional neural networks (CNNs) may be used for one or more applications contemplated herein, including but not limited to image reconstruction, super-resolution photography (including videography), low light photography (including videography), imaging applications in low power mode, object tracking, Visual-Inertial Odometry (VIO), and/or Simultaneous Location and Mapping (SLAM), including cameras and imaging applications other than visible light.

In particular embodiments, particular models or architectures suitable for creating deep learning networks may be used herein. In particular embodiments, CNNs used herein may be specifically adapted or suitable for image processing and computer vision applications. By way of example and not limitation, general or specific neural network architectures and models may be utilized in one or more embodiments contemplated herein, such as encoders, decoders, transformers, U-Nets, and/or residual neural networks (ResNets). By way of example and not limitation, one or more variants of a VGG model and/or a ResNet model, such as VGG16, VGG19, and/or ResNet-50 may be used herein, wherein '16' and '19' may indicate a number of layers of a particular model.

Separately or additionally, in particular embodiments, particular neural network architectures suitable for operation and/or interoperation for obtaining spatial warpings and/or image transformations may be used. By way of example and not limitation, deformable convolutional networks (DCNs), such as DCNv2, may be used herein. In particular embodiments, bi-directional neural networks, including without limitation recurrent neural networks (RNN), may be used in one or more embodiments herein. By way of example and not limitation, gated recurrent units (GRUs) may be used, such as for as a gating mechanism in a neural network architecture.

In particular embodiments, attention-based neural networks and/or recursive neural networks may be used herein, such as for fusion. By way of example and not limitation, attention-based neural networks may be used herein for calculating attention weights or soft weights that may be alterable during runtime. By way of example and not limitation, soft weights may be associated with epipolar constraints, such as for allowing a certain amount of error by widening a search area for correspondences around an epipolar line. By way of example and not limitation, attention weights may be associated with selective denoising, such as to avoid over smoothing high frequency features in particular areas, and/or to avoid spurious detail or artifacts in misaligned areas.

In particular embodiments, one or more calculations associated with optical flow, such as pixel-wise flow, can provide a pattern or distribution of apparent velocities of features and objects in an image, and/or between images. By way of example and not limitation, optical flow may be used to compensate and/or correct for one or both of camera motion and object motion. In particular embodiments, flow networks such as PWC-Net may be used to estimate optical flow.

It should be appreciated that while particular architectures, models, and/or methodologies are described herein to provide a better understanding, this disclosure contemplates any suitable architectures, models, and/or methodologies, and/or combinations thereof, to provide the features and functions described herein.

Figure 7:
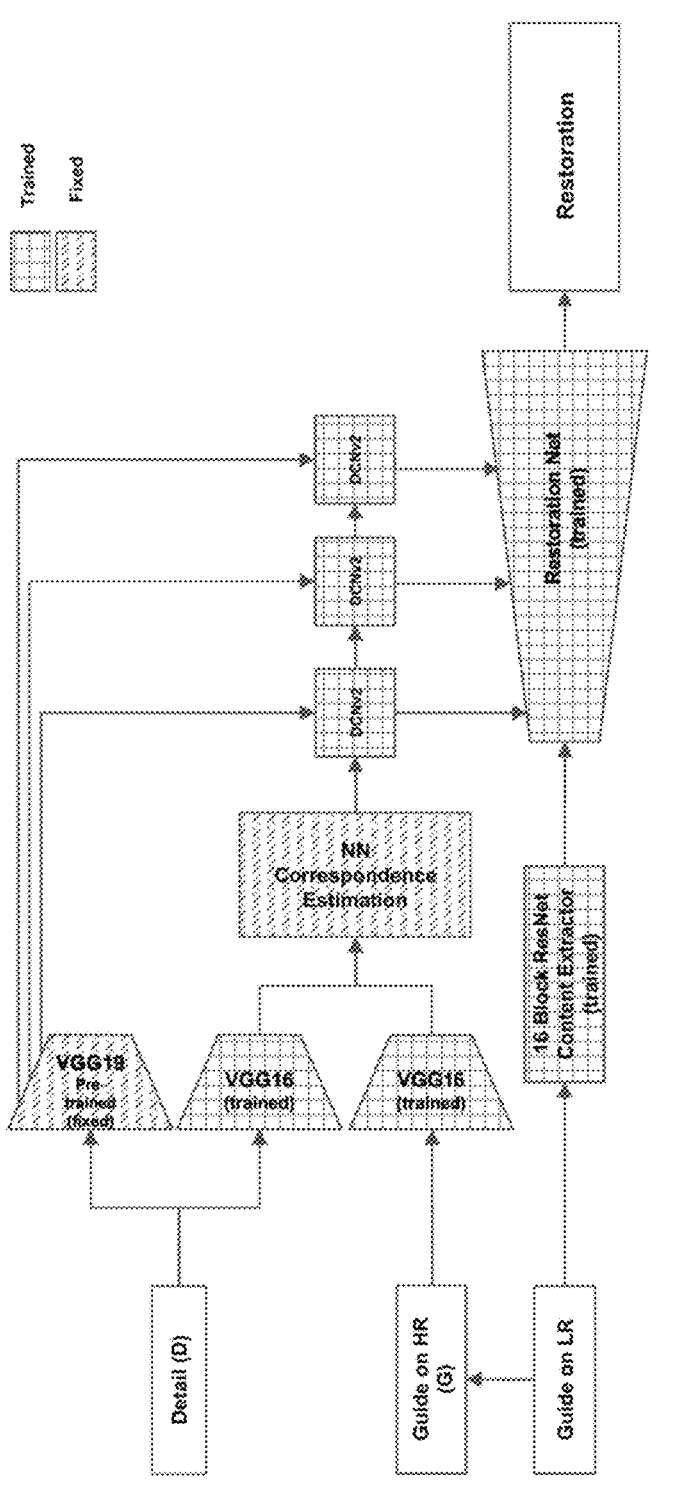
FIG. 7 illustrates an exemplary neural network architecture for image reconstruction, according to particular embodiments.

FIG. 7 illustrates an exemplary neural network architecture 700 for image reconstruction, according to particular embodiments, such as an non-limiting exemplary Embodiment 1. In particular embodiments, a local feature matching may be performed for reconstructing an output image based on distributed image acquisition. By way of example and not limitation, local feature matching may be performed between a guide image from a guide camera and detail images from a plurality of detail cameras. In particular embodiments, image patches from the detailed images may be matched relative to a guide image.

In particular embodiments, matched image patches may be used as local cues and transferred to obtain a high resolution reconstructed version (e.g., super-resolved version) of the guide image. In particular embodiments, a multiple images of arbitrary size may taken as input in a reconstruction method described herein. Separately or additionally, in particular embodiments, application of epipolar constraints may significantly reduce the search space. By way of example and not limitation, epipolar constraints may be applied at one or more stages of a training and/or inference process. By way of example and not limitation, instead of searching every corner or extent of a candidate image for a match without location cues, correspondences may be searched in crops of detail images instead of the full image to reduce search space. In particular embodiments, camera calibration may be used to restrict the search space of detail features to a set of features along one or more epipolar lines.

In particular embodiments, methods such as disclosed herein based on local feature matching may be well suited for sparse sensing approaches as, by way of example and not limitation, it can permit reuse of images captured at different times, and/or may not require an exact scene reconstruction. In particular embodiments, methods such as disclosed herein based on local feature matching may provide overall robustness and good quality trade-off with decreasing performance due to more image degradations (noise, blurring and debayering artifacts) and reconstructing regular structures and text in general. Additional details are provided herein with reference to a non-limiting exemplary Embodiment 1. It will be appreciated that while specific features, architectures, and/or process steps for training and/or inference may be described herein to provide a better understanding, any suitable features, architectures, and/or process steps are contemplated for implementing the disclosed methods and features. Furthermore, particular embodiments are contemplated that may separately or additionally combine certain aspects of any exemplary embodiments disclosed herein.

Figure 8:
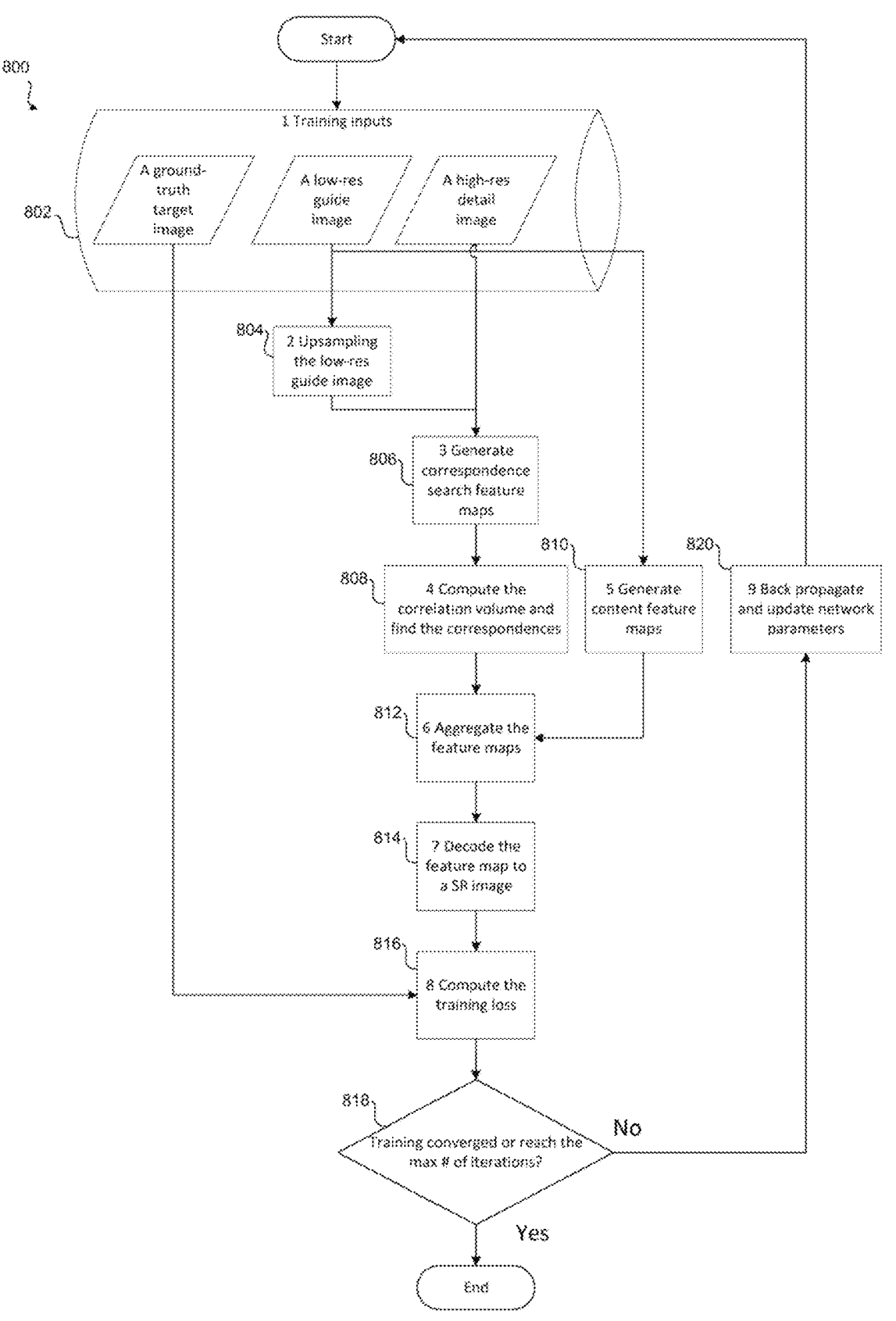
FIG. 8 illustrates an exemplary training process flow for image reconstruction, according to particular embodiments.

FIG. 8 illustrates an exemplary training process flow 800 for image reconstruction, according to particular embodiments, such as non-limiting exemplary Embodiment 1. In particular embodiments, in a step 802, training inputs are provided, which may include a set of images, such as a image pair including a low-resolution guide image $I_{G(LR)}$ and a high-resolution detail image $I_D$. Additionally, in particular embodiments, training inputs may include a ground-truth target image I. In particular embodiments, the low-resolution guide image $I_{G(LR)}$ may be resampled, for example, upsampled (804) to a high-resolution guide image $I_{G(HR)}$. By way of example and not limitation, upsampling may be performed by the bicubic interpolation method. In particular embodiments, in a step 806, a correspondence searching feature map, such as based on embeddings, may be generated for image $I_{G(HR)}$ as $e_{G(Corr)}$, and a correspondence searching feature map may be generated for high-resolution detail image $I_D$ as $e_{D(Corr)}$. In particular embodiments, in a step 808, a correlation map may be computed between the feature map $e_{D(Corr)}$ and the feature map $e_{G(Corr)}$. In particular embodiments, a correspondence may be found for each pixel between image $I_{G(HR)}$ and image $I_D$.

In particular embodiments, in a step 810, a content feature map may be generated for image $I_{G(LR)}$ as $e_{G(Cont)}$. In particular embodiments, a content feature map may be generated for image $I_D$ as $e_{D(Cont)}$. In particular embodiments, in a step 812, the feature maps $e_{G(Cont)}$ and $e_{D(Cont)}$ may be aggregated into a single feature map $e_{SR}$ based on previously computed correspondences. By way of example and not limitation, the feature map $e_{SR}$ may be computed based on the pixel-wise correspondence determined between image $I_{G(HR)}$ and image $I_D$. In particular embodiments, in a step 814, the aggregated feature map $e_{SR}$ may be decoded with a neural network decoder to reconstruct the final SR image $I_{SR}$.

Herein, "SR" refers to Super-Resolution, which may generally be associated with recovery, reconstruction, and/or restoration of a high resolution (HR) image from one or more counterpart low resolution (LR) images. As used herein, the terms or initialisms LR (denoting low resolution), HR (denoting high resolution), and/or SR (denoting super resolution) are provided for conciseness, and are not to be construed to be limiting in any way.

In particular embodiments, in a step 816, a training loss, such as L1 loss, may be computed between the reconstructed SR image $I_{SR}$ and the ground-truth target image I. In particular embodiments, the network parameters may be back-propagate and updated based on the computed loss. In particular embodiments, in a step 818, one or more of the previous steps may be iterated until the training is converged, via back propagation and network parameter updation in step 820.

Figure 9:
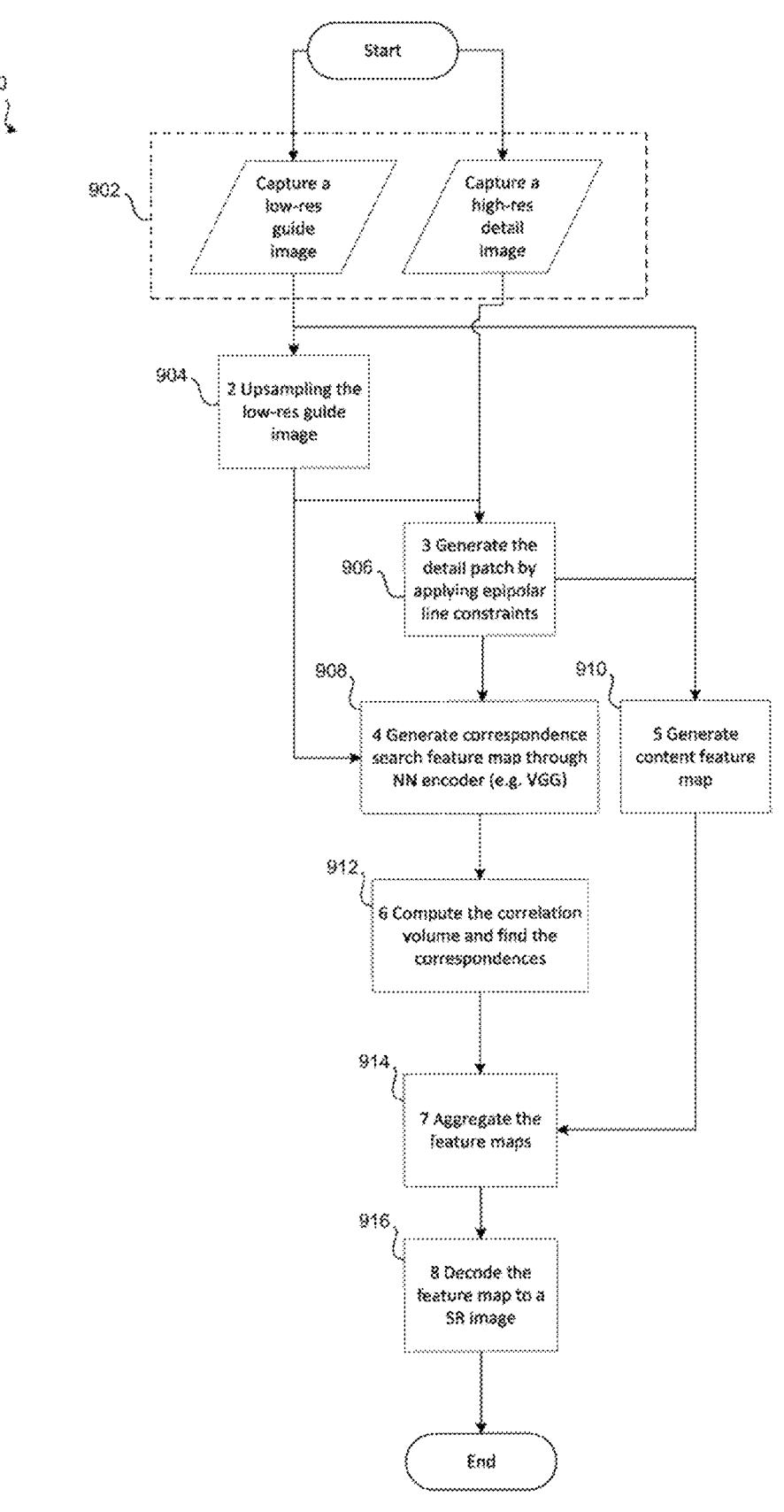
FIG. 9 illustrates an exemplary use process flow for image reconstruction, according to particular embodiments.

FIG. 9 illustrates an exemplary use, or inference, process flow 900 for image reconstruction, according to particular embodiments, such as non-limiting exemplary Embodiment 1. In particular embodiments, in a step 902, a low-resolution guide image $I_{G(LR)}$ and a plurality of high-resolution detail images $I_{D1}$-$I_{D9}$ may be captured as inputs. In particular embodiments, in a step 904, the low-resolution guide image $I_{G(LR)}$ may be upsampled to a high-resolution guide image $I_{G(HR)}$. By way of example and not limitation, upsampling may be performed by the bicubic interpolation method. In particular embodiments, in a step 906, given the high-resolution guide image $I_{G(HR)}$, epipolar line constraints may applied, the detail image portions from images $I_{D1}$~$I_{D9}$ that contain corresponding epipolar lines may be accordingly efficiently found, and all detail image portions may be assembled into one single detail patch $I_D$. In particular embodiments, in a step 908, a correspondence searching feature map (i.e. embeddings) for image $I_{G(HR)}$ may be generated as $e_{G(Corr)}$, and the correspondence searching feature maps for image $I_D$ may be generated as $e_{D(Corr)}$.

In particular embodiments, in a step 910, a content feature map for image $I_{G(LR)}$ may be generated as $e_{G(Cont)}$, and the content feature map for image $I_D$ may be generated as $e_{D(Cont)}$. In particular embodiments, in a step 912, a correlation map or volume may be computed between the feature map $e_{D(Corr)}$ and the feature map $e_{G(Corr)}$. In particular embodiments, epipolar line constraints may be applied to the computed correlation score. In particular embodiments, the correspondence for each pixel between image $I_{G(HR)}$ and image $I_D$ may be accordingly found. In particular embodiments, in a step 914, the feature maps $e_{G(Cont)}$ and $e_{D(Cont)}$ may be aggregated into one single feature map $e_{SR}$. By way of example and not limitation, the feature maps may be aggregated according to the computed correspondences from step 908. In particular embodiments, in a step 916, the aggregated feature map $e_{SR}$ may be decoded with a neural network decoder to reconstruct a final SR image. In particular embodiments, the decoder may trained or retrained based on camera characteristics and data, such as from calibration, for optimal performance.

In particular embodiments, reconstruction methods based on local feature matching, such as those disclosed herein by way of non-limiting example, may provide good overall image matching and robustness. In particular embodiments, application of one or more constraints based on a per camera and/or inter-camera information, such as calibration data and/or epipolar constraints, can further improve performance and/or efficiency of reconstruction. By way of example and not limitation, by applying soft constraints, a certain amount of error may be allowed by widening the search area for correspondences around the epipolar line.

Figure 10A:
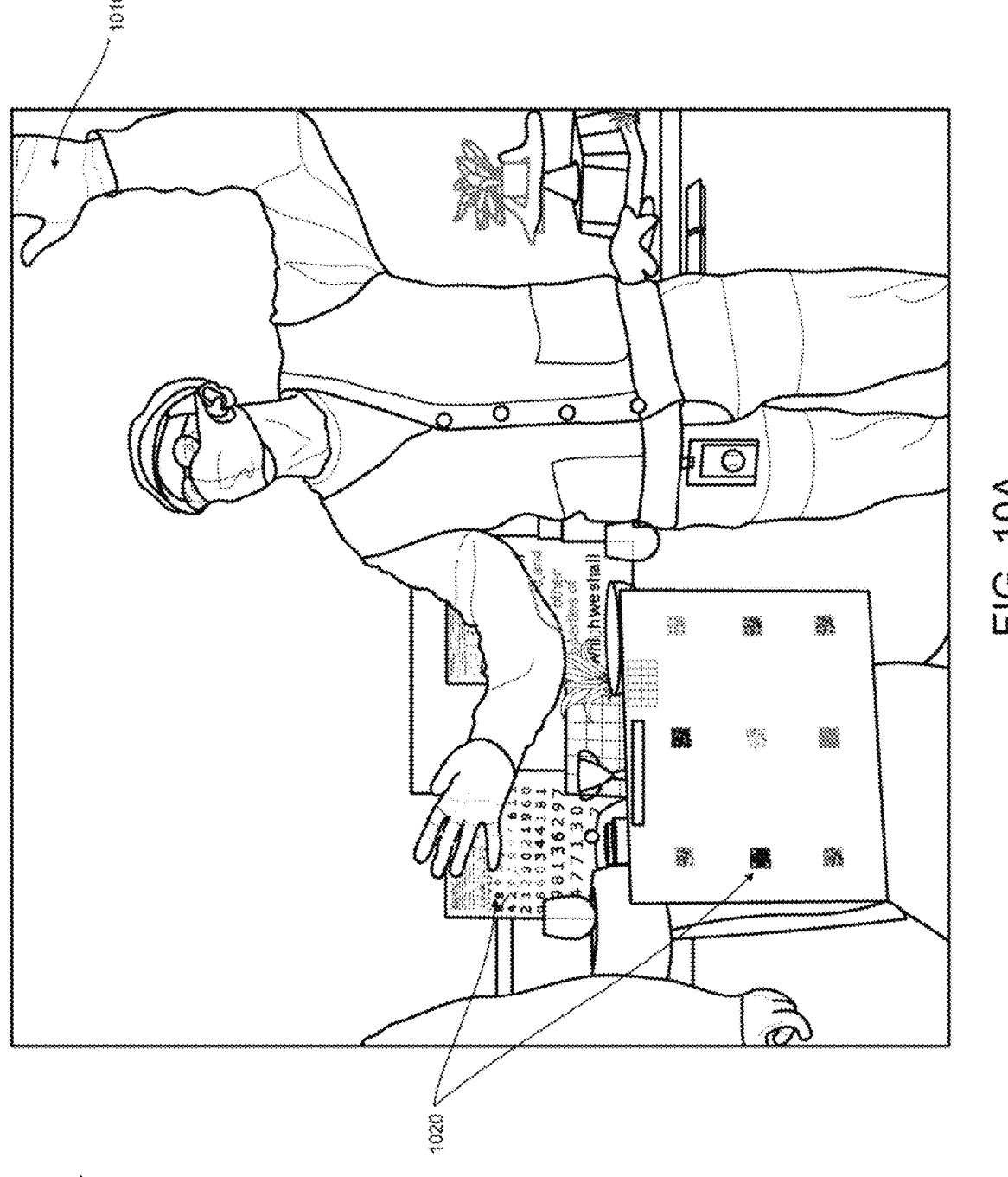
FIG. 10A illustrates a schematic of a reconstructed output image, according to particular embodiments.
Figure 10B:
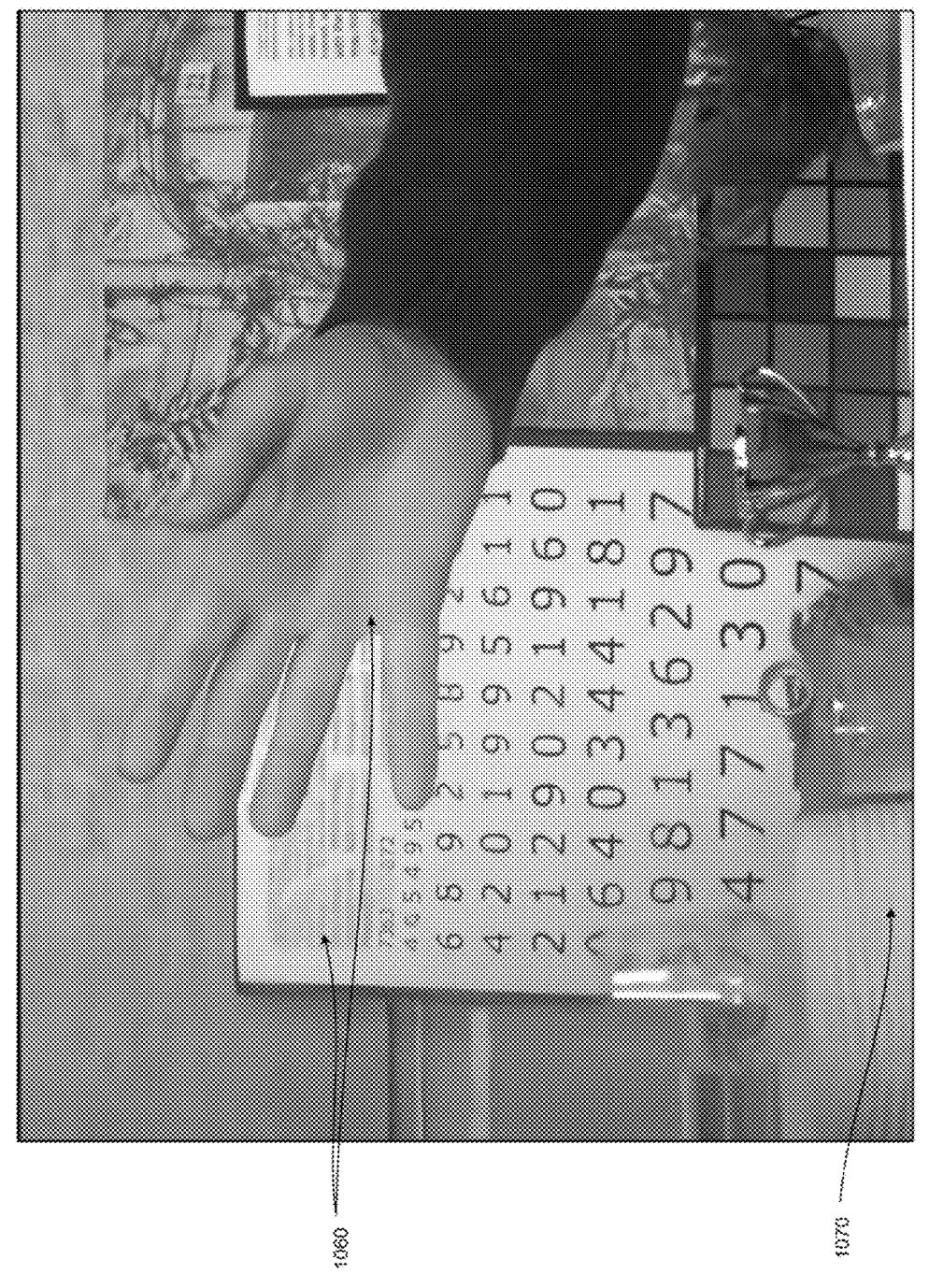
FIG. 10B illustrates an enlarged fragment of a reconstructed output image, according to particular embodiments.

FIG. 10A illustrates a schematic reconstructed output image 1000, according to particular embodiments, such as non-limiting exemplary Embodiment 1. FIG. 10B illustrates an enlarged fragment 1050 of the corresponding exemplary reconstructed output image, according to particular embodiments, such as non-limiting exemplary Embodiment 1. By way of example and not limitation, such as indicated by 1010, an output image from Embodiment 1 may depict minimal ghosting or overlaps based on robustly correcting and aligning camera input images. By way of example and not limitation, however, as indicated by 1020 in FIG. 10A, as well as 1060 and 1070 in FIG. 10B, output images may include smearing, reconstruction artifacts, and/or patches of loss of fine detail.

Figure 11:
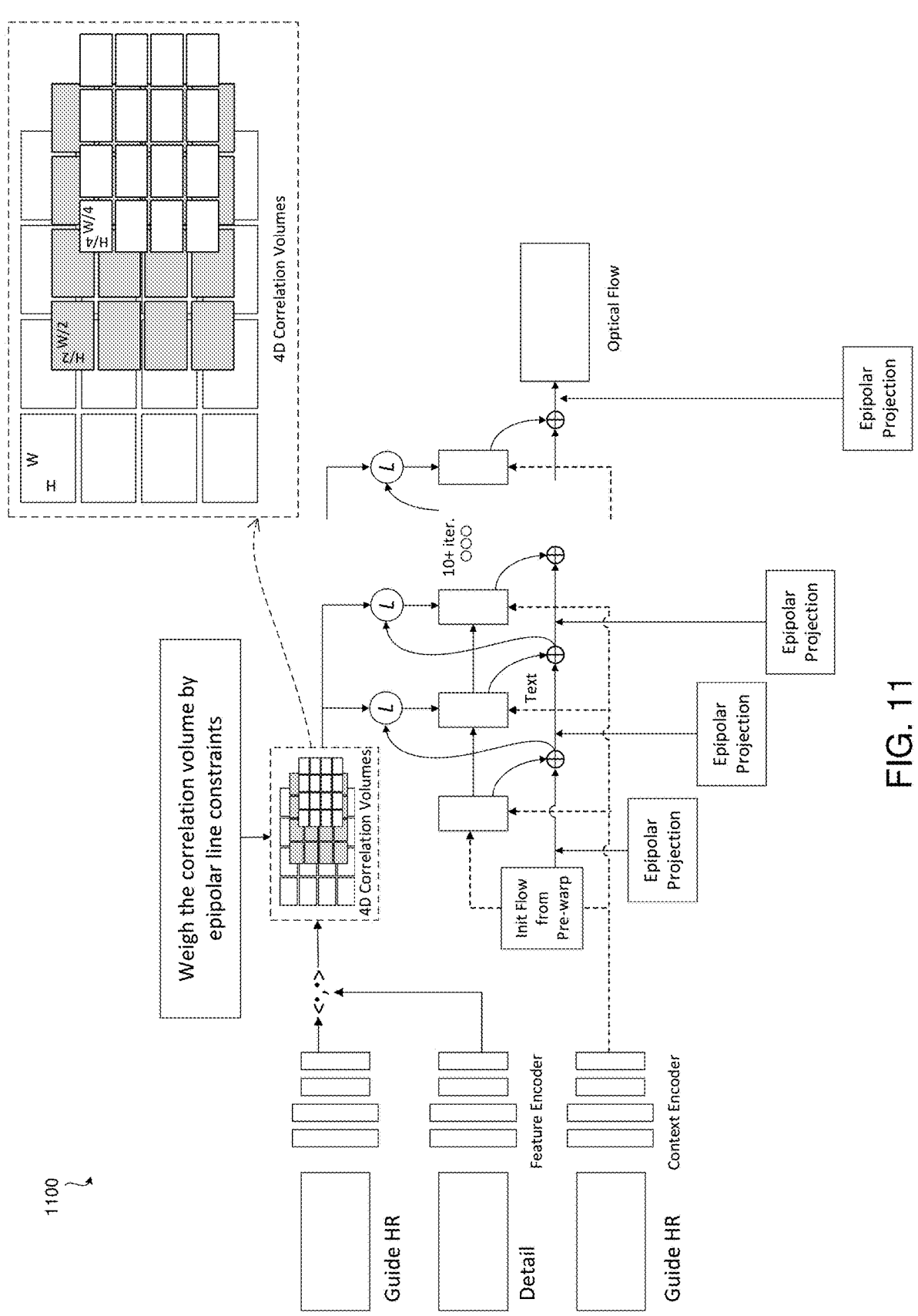
FIG. 11 illustrates an exemplary neural network architecture for image reconstruction, according to particular embodiments.

FIGS. 11 and 12 illustrate non-limiting exemplary aspects 1100, 1200, and 1250 of a neural network architecture for image reconstruction, according to particular embodiments, such as an non-limiting exemplary Embodiment 2. In particular embodiments, a feature encoder may be used to extract pixel-level features from the input images obtained from guide camera 250 as well as detail cameras 260. Additionally, in particular embodiments, a context encoder may be used to extract features from an input derived from guide camera 250 only (for example, an upscaled guide input.) In particular embodiments, a correlation layer may generate a correlation volume, such as a multi-level correlation volume, such as based on all pairs of features vectors. In particular embodiments, a flow target location may be constrained to lie on epipolar lines, for example, by projection. In particular embodiments, additionally or alternatively, a correlation volume may be weighed based on the epipolar lines. By way of example and not limitation, the correlation volume may be weighed proportional to an inverse distance from pixels to corresponding epipolar lines. In particular embodiments, an updating step may be used to iteratively update optical flow. In particular embodiments, optical flow-based correspondences between a guide image and a detail image may integrate pre-warping and/or epipolar line constraints. Additional details are provided herein with reference to a non-limiting exemplary Embodiment 2. It will be appreciated that while specific features, architectures, and/or process steps for training and/or inference may be described herein to provide a better understanding, any suitable features, architectures, and/or process steps are contemplated for implementing the disclosed methods and features. Furthermore, particular embodiments are contemplated that may separately or additionally combine certain aspects of any exemplary embodiments disclosed herein.

Figure 13:
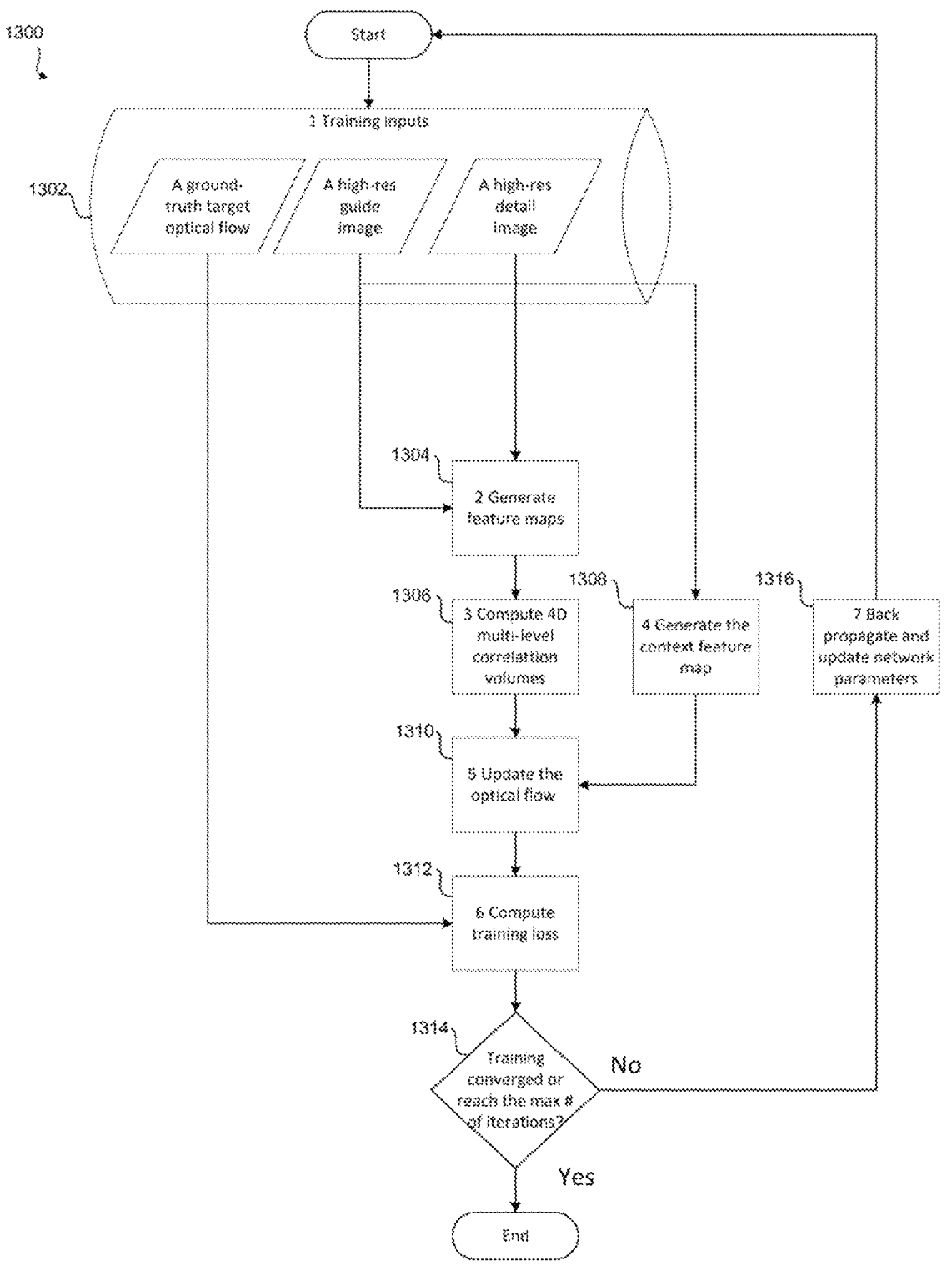
FIG. 13 illustrates an exemplary training process flow for image reconstruction, according to particular embodiments.

FIG. 13 illustrates an exemplary training process flow 1300 for image reconstruction, according to particular embodiments, such as non-limiting exemplary Embodiment 2. In particular embodiments, training Inputs comprising a set of images or images pairs may be provided as input in a step 1302. By way of example and not limitation, image pairs for input may include a guide HR image $I_G$, a high-resolution detail image $I_D$, and/or a ground-truth target optical flow F. In particular embodiments, in a step 1304, a feature map (i.e., embeddings) may be generated for image $I_G$ as $e_G$, and corresponding feature maps for image $I_D$ may be generated as $e_D$. In particular embodiments, in a step 1306, multi-level (e.g., 4 dimensional) correlation volumes may be computed between the feature map $e_G$ and the feature map $e_D$. In particular embodiments, in a step 1308, a context feature map for image $I_G$ may be generated as $e_{G(Cont)}$. In particular embodiments, an incremental optical flow $\Delta f$ according to the feature map $e_{G(Cont)}$ from step 1308, the correlation volumes from step 1306, and an optical flow from the previous iteration may be computed. By way of example and not limitation, an initial value of optical flow may be zero everywhere. In particular embodiments, in a step 1310, the optical flow f may be updated, given the previous optical flow f' and the incremental optical flow $\Delta f$: $f=f'+\Delta f$. In particular embodiments, in a step 1312, a loss, such as L1 loss, may be computed between the computed latest optical flow f and the ground-truth optical flow F. In particular embodiments, in a step 1316, network parameters may be back-propagated and updated based on computed loss. In particular embodiments, in a step 1314, a subset of the steps may be iterate until the training is converged. By way of example and not limitation, steps 1304 through 1312 may be iterated until the training is converged, according to suitable convergence criteria.

Figure 14:
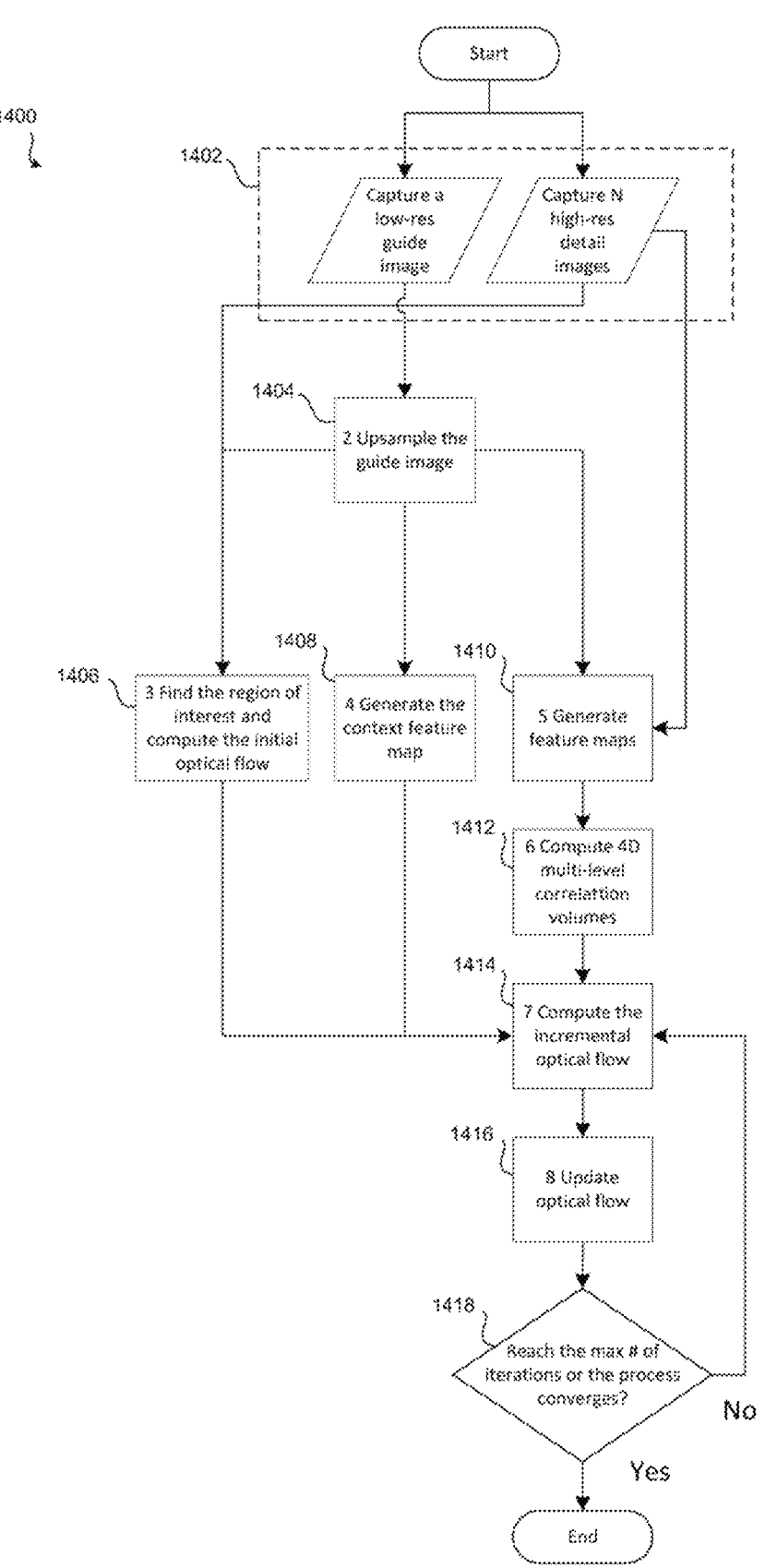
FIG. 14 illustrates an exemplary use process flow for image reconstruction, according to particular embodiments.

FIG. 14 illustrates an exemplary use process flow 1400 for image reconstruction, according to particular embodiments, such as non-limiting exemplary Embodiment 2. In particular embodiments, in a step 1402, input may be captured or provided comprising a captured low-resolution guide image $I_{G(LR)}$ and high-resolution detail images $I_{D1}$~$I_{D9}$. In particular embodiments, details images from non-limiting exemplary Embodiment 1 may be used as input to non-limiting exemplary Embodiment 2. In particular embodiments, the low-resolution guide image $I_{G(LR)}$ may be upsampled, in a step 1404, to a high-resolution guide image $I_{G(HR)}$. By way of example and not limitation, upsampling may be performed by the bicubic interpolation method. In particular embodiments, in a step 1406, given the high-resolution guide image $I_{G(HR)}$, the homography transformations $T_{D1}$~$T_{D9}$ may be estimated between $I_{G(HR)}$ and $I_{D1}$~$I_{D9}$, and a Region of Interest (RoI) for each detail image $I_{D\{i\}}$, for example, for ($I_{D1}$~$I_{D9}$), may be computed. Further, in particular embodiments, the Region of Interest (RoI) on the high-resolution guide image as $I_G$ may be defined, along with its corresponding detail image is $I_D$, and its corresponding homography transformation as the pre-warp transformation T. In particular embodiments, the optical flow f from the pre-warp transformation T may be initialized.

In particular embodiments, in a step 1408, the context feature map for image $I_G$ may be generated as $e_{G(Cont)}$. In particular embodiments, in a step 1410, the feature map, i.e., embeddings, for image $I_G$ may be generated as $e_G$, and the feature maps for image $I_D$ may be generated as $e_D$. In particular embodiments, in a step 1412, correlation volumes (for e.g., multi-level 4D correlation volumes) between the feature map $e_G$ and the feature map $e_D$ may be computed. In particular embodiments, the computed correlation volumes (e.g., multi-level 4D correlation volumes) may be weighed by integrating epipolar line constraints. In particular embodiments, in a step 1414, the incremental optical flow $\Delta f$ may be computed according to the previously computed correlation volumes, and according to the previously computed feature map $e_{G(Cont)}$, and/or according to the optical flow from the previous iteration. In particular embodiments, an initial value of optical flow may be assumed to be zero everywhere. In particular embodiments, in a step 1416, the incremental optical flow $\Delta f$ computed in step 1414 may be updated by constraining it along the epipolar lines. In particular embodiments. the optical flow f may be updated given the previous optical flow f' and the incremental optical flow, as $\Delta f$: $f=f'+\Delta f$. In particular embodiments, in a step 1418, a suitable portion of the use or inference process may be iterated a fixed number of times, or until the process converges. By way of example and not limitation, steps 1414 through 1418 of the use or inference process may be iterated a predetermined number of times, such as 32 times, or until the process converges, such as based on one or more convergence criteria.

Figure 15A:
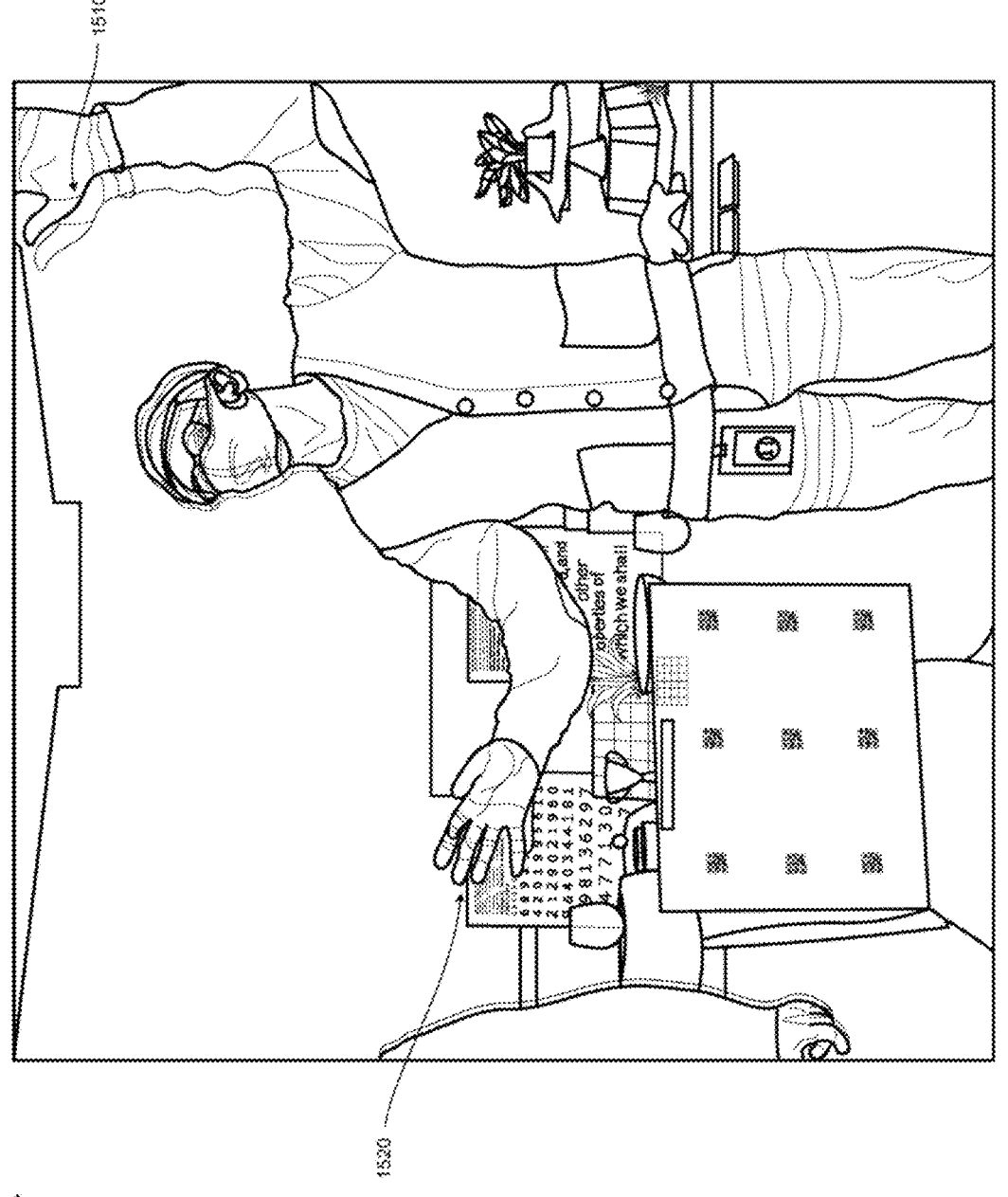
FIG. 15A illustrates a schematic of a reconstructed output image, according to particular embodiments.
Figure 15B:
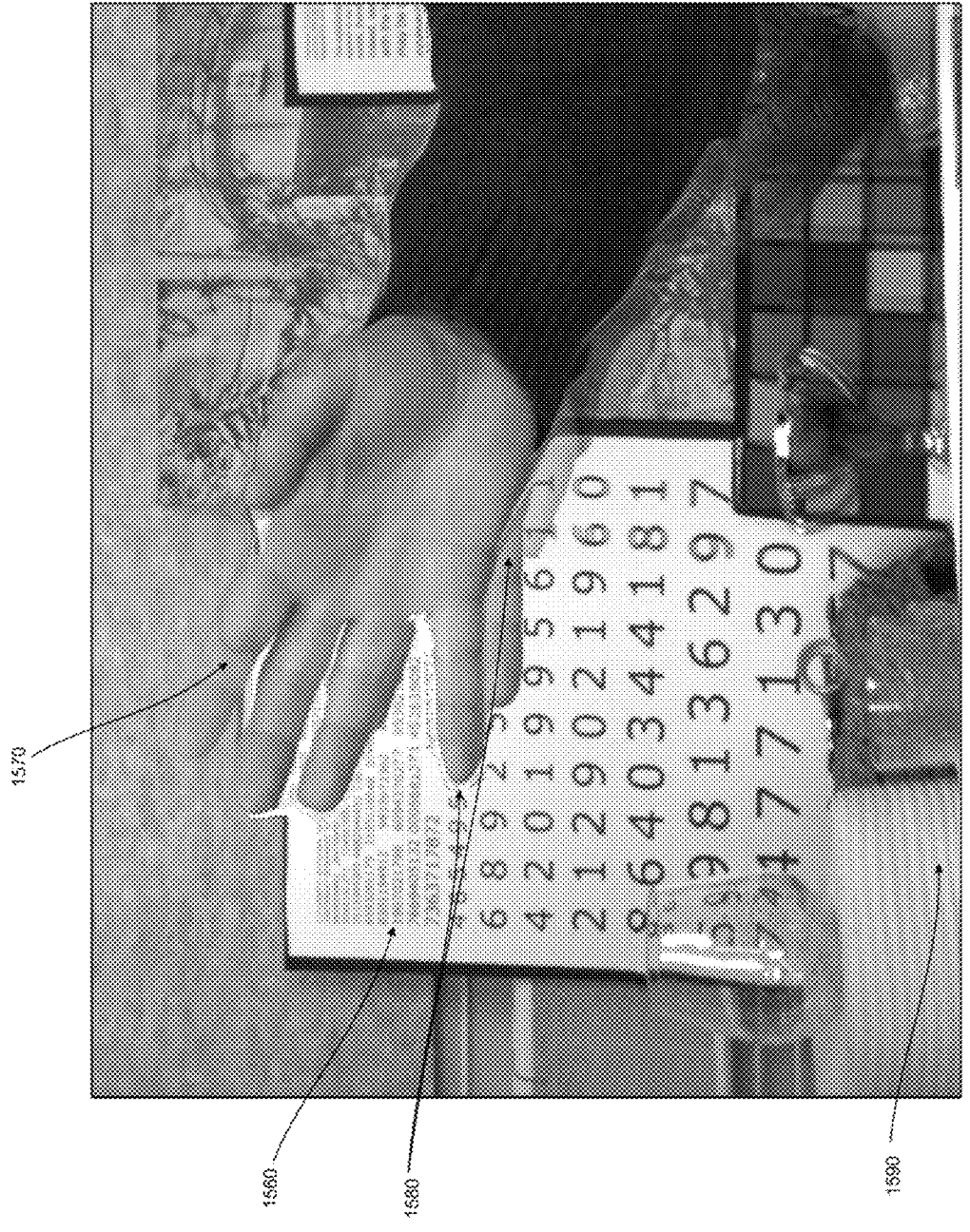
FIG. 15B illustrates an enlarged fragment of a reconstructed output image, according to particular embodiments.

FIG. 15A illustrates a schematic reconstructed output image 1500, according to particular embodiments, such as non-limiting exemplary Embodiment 2. FIG. 15B illustrates an enlarged fragment 1550 of the corresponding exemplary reconstructed output image, according to particular embodiments, such as non-limiting exemplary Embodiment 2. By way of example and not limitation, as depicted by 1510 and 1520 of FIG. 15A, as well as 1570 and 1580 of FIG. 15B, particular output images may include blurring, ghosts, and/or double images for matching particular features, such as overlapping features captured by multiple cameras. By way of example and not limitation, as depicted by 1560 and 1590 of FIG. 15B, an output image may capture and/or retain good detail level in several parts, such as text and high frequency structural detail, such as relative to FIG. 10B.

Figure 16:
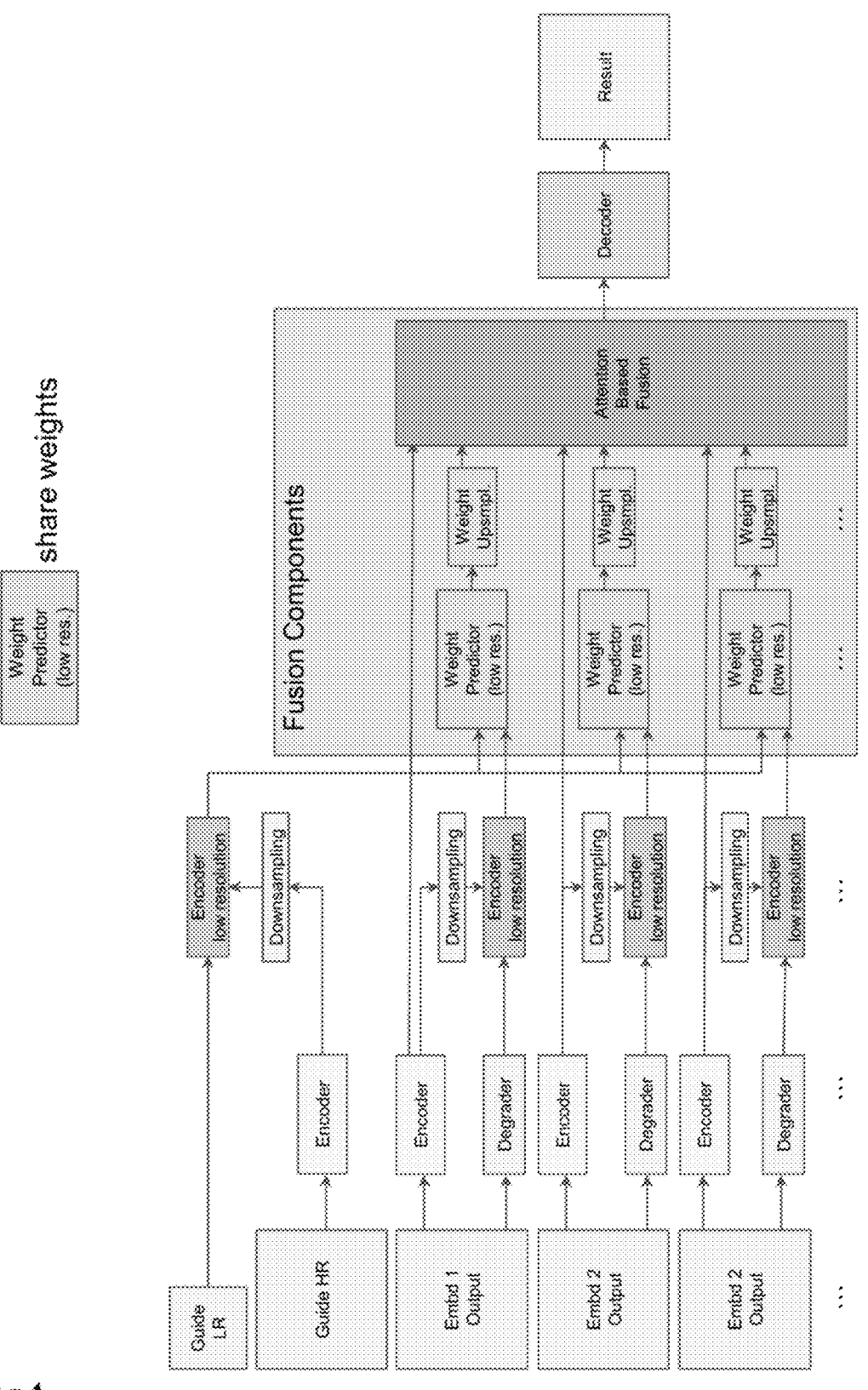
FIG. 16 illustrates an exemplary neural network architecture for image reconstruction, according to particular embodiments.

FIG. 16 illustrates an exemplary neural network architecture 1600 for image reconstruction, according to particular embodiments, such as non-limiting exemplary Embodiment 3. In particular embodiments, as will be further described with reference to exemplary training and inference processes, the guide image and all detail images (for e.g., 9 detail images) may be provided to one or more instances of a suitable algorithm based on local feature matching, such as non-limiting exemplary Embodiment 1, and output image $I_1$ may be obtained. Additionally, in particular embodiments, the guide image and all detail images (for e.g., 9 detail images) may be provided to one or more instances of a suitable algorithm based on using optical flow-based correspondences, such as non-limiting exemplary Embodiment 2, and an output image set $\{I_2\}$ may be obtained. By way of example and not limitation, an additional low resolution guide image may be used, in particular embodiments, for fusion weight prediction only. In particular embodiments, the additional low resolution guide image may not be used to fuse the final output. Additional details are provided herein with reference to a non-limiting exemplary Embodiment 3. It will be appreciated that while specific features, architectures, and/or process steps for training and/or inference may be described herein to provide a better understanding, any suitable features, architectures, and/or process steps are contemplated for implementing the disclosed methods and features. Furthermore, particular embodiments are contemplated that may separately or additionally combine certain aspects of any exemplary embodiments disclosed herein.

Figure 17:
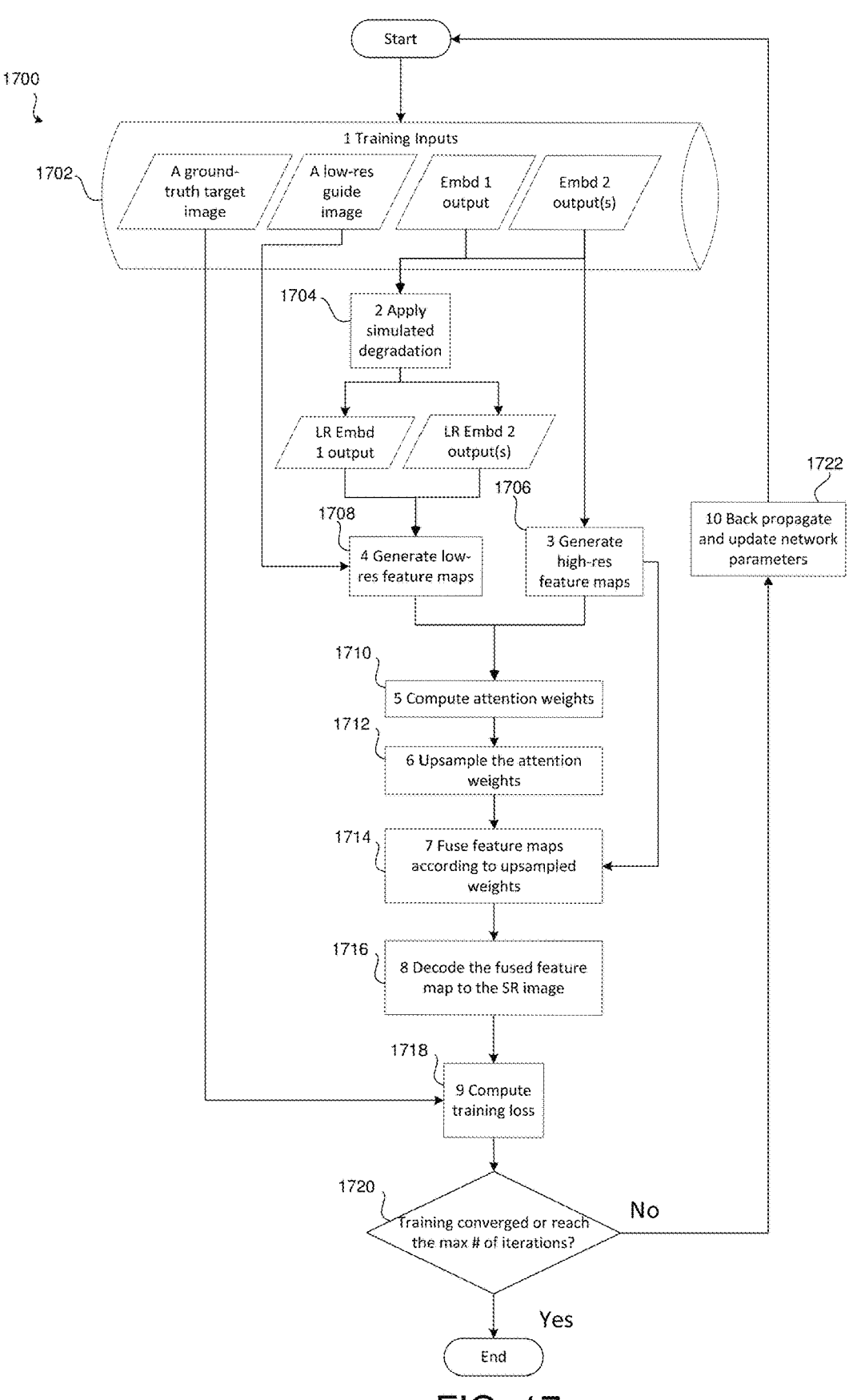
FIG. 17 illustrates an exemplary training process flow for image reconstruction, according to particular embodiments.

FIG. 17 illustrates an exemplary training process flow 1700 for image reconstruction, according to particular embodiments, such as non-limiting exemplary Embodiment 3. In particular embodiments, prior to training an exemplary embodiment for fusion, exemplary embodiments based on local feature matching and on optical flow-based correspondences may need to be generated. In particular embodiments, soft epipolar constraints may be separately or additionally imposed.

By way of example and not limitation, prior to training an Embodiment 3 for fusion, Embodiments 1 and 2 may be trained such that output images from Embodiments 1 and 2 may be generated. In particular embodiments, training sets of samples may be defined and provided in a step 1702, where each sample may contain the ground truth image $I_{G(HR)}$, a low-resolution guide image $I_{G(LR)}$, the bicubic-interpolated high-resolution guide image $I_{G(HR)}$, the output SR image from non-limiting exemplary Embodiment 1

$I_{(SR)Embd1}$, and the reprojected detail images as output from non-limiting exemplary Embodiment 2 $I_{(SR)Embd2,1}$~$I_{(SR)Embd2,9}$ (assuming, by way of example and not limitation, that i=9 detail images $I_{D1}$~$I_{D9}$ are used in non-limiting exemplary Embodiment 2). In particular embodiments, in a step 1704, a simulated degradation may be applied to a copy of $I_{(SR)Embd1}$ and a copy of each $I_{(SR)Embd2,i}$. By way of example and not limitation, the simulated degradation may be applied such that each resulting degraded image $I_{(LR)Embd1}$ and $I_{(LR)Embd2,i}$ may have the same resolution as $I_{G(LR)}$. By way of example and not limitation, a degradation filter may comprise a spatially varying blurring kernel to downsample the given input image. In particular embodiments, in a step 1706, each HR/SR image may be input into an Encoder to yield full-resolution encoded features $E_{G(LR)}$, $E_{(SR)Embd1}$, and $E_{(SR)Embd2,i}$. In particular embodiments, in a step 1708, each LR image may be input into a second, low-res Encoder to yield low-resolution encoded features $e_{G(LR)}$, $e_{(SR)Embd1}$, and $e_{(SR)Embd2,i}$. In particular embodiments, in a step 1710, $e_{G(LR)}$, $e_{(SR)Embd1}$, and $e_{(SR)Embd2,i}$ may be concatenated and input to a low-resolution weight predictor network that computes attention weights $w_{LR}$.

In particular embodiments, in a step 1712, these attention weights may be input into a weight resampling network, such as a weight upsampling network. By way of example and not limitation, the weight upsampling network may comprise pixel-shuffle and ResBlocks, so as to yield normalized full-resolution attention weights $w_{HR}$. By way of example and not limitation, in a step 1714, $w_{HR}$ may be multiplied against full-resolution features $E_{G(LR)}$, $E_{(SR)Embd1}$, and $E_{(SR)Embd2,i}$ to yield fused features F. In particular embodiments, in a step 1716, the fused features may be input into a decoder network, which may output the final SR image $I_{(SR)Embd3}$. In particular embodiments, in a step 1718, a loss function (e.g., L1 loss) may be computed between $I_{(SR)Embd3}$ and the ground truth image $I_{G(HR)}$. In particular embodiments, in a step 1722, the gradients of the loss may be back-propagated through the network to update the network weights. In particular embodiments, in a step 1720, a suitable portion of the steps described above may be repeat until the training converges.

Figure 18:
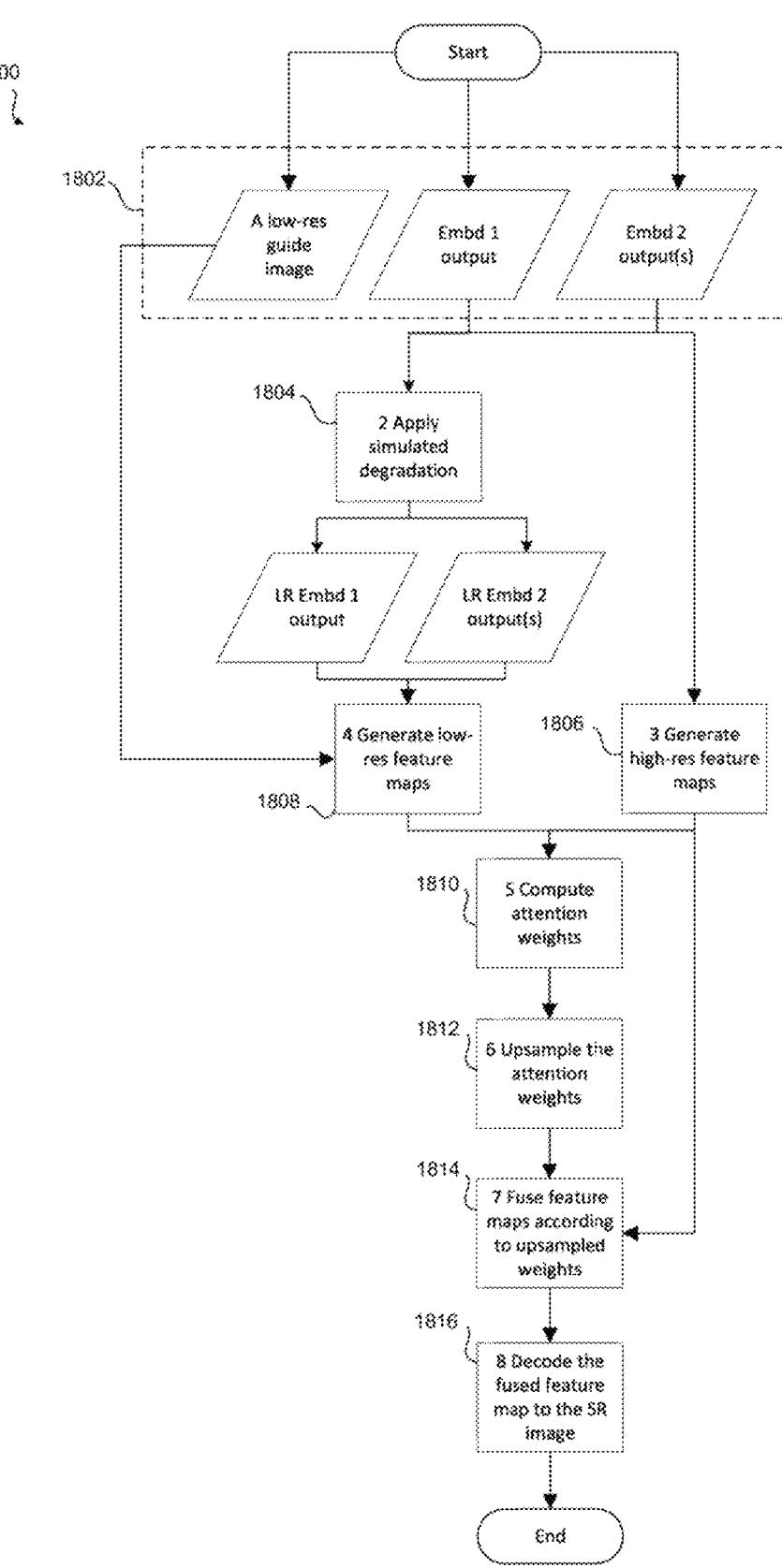
FIG. 18 illustrates an exemplary use process flow for image reconstruction, according to particular embodiments.

FIG. 18 illustrates an exemplary use process flow 1800 for image reconstruction, according to particular embodiments, such as non-limiting exemplary Embodiment 3. By way of example and not limitation, to provide an understanding, a use or inference process for non-limiting exemplary Embodiment 3 may assume that both Embodiment 1 and Embodiment 2 (each non-limiting exemplary) have already been executed. In particular embodiments, in a step 1802, inference inputs for Embodiment 3 may comprise a low-resolution guide image $I_{G(LR)}$, the bicubically-interpolated high-resolution guide image $I_{G(HR)}$, the output SR image from Embodiment 1 $I_{(SR)Embd1}$, and the reprojected detail images as output from non-limiting exemplary Embodiment 2 $I_{(SR)Embd2,1}$~$I_{(SR)Embd2,9}$ (assuming, by way of example and not limitation, that i=9 detail images $I_{D1}$~$I_{D9}$ as used in non-limiting exemplary Embodiment 2). In particular embodiments, in a step 1804, a simulated degradation may be applied to a copy of $I_{(SR)Embd1}$ and a copy of each $I_{(SR)Embd2,i}$. By way of example and not limitation, the simulated degradation may be applied such that each resulting degraded image $I_{(LR)Embd1}$ and $I_{(LR)Embd2,i}$ may have the same resolution as $I_{G(LR)}$. In particular embodiments, in a step 1806, each HR/SR image may be input into an Encoder to yield full-resolution encoded features $E_{G(LR)}$, $E_{(SR)Embd1}$, and $E_{(SR)Embd2,i}$. In particular embodiments, in a step 1808, each LR image may be input into a second, low-res Encoder to yield low-resolution encoded features $e_{G(LR)}$, $e_{(SR)Embd1}$, and $e_{(SR)Embd2,i}$. In particular embodiments, in a step 1810, $e_{G(LR)}$, $e_{(SR)Embd1}$, and $e_{(SR)Embd2,i}$ may be concatenated and input to a low-resolution weight predictor network that computes attention weights $w_{LR}$.

In particular embodiments, in a step 1812, these weights may be input into a weight upsampling network. By way of example and not limitation, the weight upsampling network may consist of pixel-shuffle and ResBlocks, so as to yield normalized full-resolution attention weights $w_{HR}$. By way of example and not limitation, in a step 1814, $w_{HR}$ may be multiplied against full-resolution features $E_{G(LR)}$, $E_{(SR)Embd1}$, and $E_{(SR)Embd2,i}$ to yield fused features F. In particular embodiments, in a step 1816, the fused features may be input into a decoder network, which may output the final SR image $I_{(SR)Embd3}$.

Figure 19A:
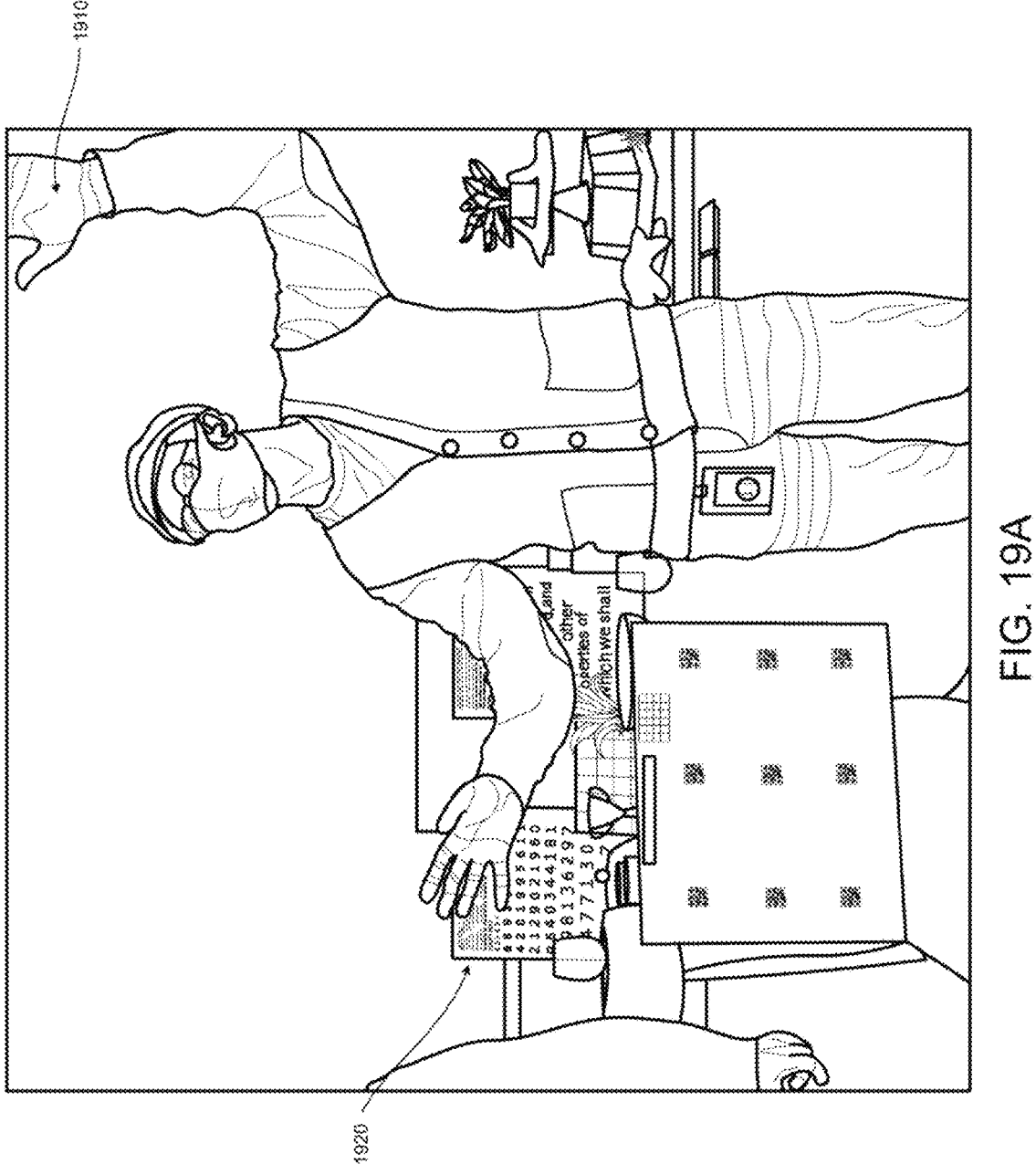
FIG. 19A illustrates a schematic of a reconstructed output image, according to particular embodiments.
Figure 19B:
FIG. 19B illustrates an enlarged fragment of a reconstructed output image, according to particular embodiments.

FIG. 19A illustrates a schematic reconstructed output image 1900, according to particular embodiments, such as non-limiting exemplary Embodiment 3. FIG. 19B illustrates an enlarged fragment 1950 of the corresponding exemplary reconstructed output image, according to particular embodiments, such as non-limiting exemplary Embodiment 3. By way of example and not limitation, as depicted by 1910 of FIG. 19A and 1960 of FIG. 19B, an output based on a fusion method such as non-limiting exemplary Embodiment 3 may show few or none of the alignment artifacts, ghosting, and/or blurring that may be observed in instances of using non-limiting exemplary Embodiment 2-like algorithms. Separately or additionally, such as depicted by 1920 of FIG. 19A and/or by 1970 and 1980 of FIG. 19B, the output image shows good retention of fine detail, such as in small font text blocks and/or high frequency structures, with little to none of the smearing or patchy loss of detail that may be observed in instance of using Embodiment 1-like algorithms.

In particular embodiments, based on a reasonable likelihood of body motion (such as head motion) for a wearable AR device such as AR glasses 100, it may be desirable to capture images without motion blurs. In low light environments, to facilitate image capture with suitably short exposure times to avoid motion blur (and/or to reduce blur due to subject motion), images and/or videos may be captured with high frame rates, and/or in burst mode, as has been previously discussed herein. Additional details are provided herein with reference to a non-limiting exemplary Embodiment 4. It will be appreciated that while specific features, architectures, and/or process steps for training and/or inference may be described herein to provide a better understanding, any suitable features, architectures, and/or process steps are contemplated for implementing the disclosed methods and features. Furthermore, particular embodiments are contemplated that may separately or additionally combine certain aspects of any exemplary embodiments disclosed herein.

In particular embodiments, a sequence of images, such as raw images with Bayer pattern, may be captured at a high frame rate from a single camera. In particular embodiments, the captured images may be passed through an encoder to obtain their respective feature space representations. In particular embodiments, a one of the burst images may be selected as the reference frame for the set. In particular embodiments, all other frames may then be aligned to the reference frame in feature space. In particular embodiments, all the feature space representations may be merged together through an attention-based network. In particular embodiments, a decoder may finally take the fused feature space representation and reconstruct it into an output image. By way of example and not limitation, an output image reconstructed by such a process may appear similar to the reference frame image, but having much lower noise levels. In particular embodiments, the output image may have the same resolution as the reference image, or could be a super resolved version of it. By way of example and not limitation, the output image may have 4× as many pixels in each dimension as the reference image.

In particular embodiments, a high resolution dataset may be used for training purposes. In particular embodiments, the high resolution dataset used for training may be augmented for particular camera characteristics, such as white balance for consistency with camera raw images and improved color performance. In particular embodiments, a degradation model may be used during training that is based on camera-specific information as has been described herein, to improve denoising/deblur performance.

In particular embodiments, a burst mode implementation may be integrated with other algorithms provided herein. By way of example and not limitation, a 4× super resolution factor may be implemented along with denoising for detail images, such as to maintain a balance between quality and computational resource requirements. In particular embodiments, a denoising operation may be applied at 1×, i.e., prior to super resolution methods.

Figure 20:
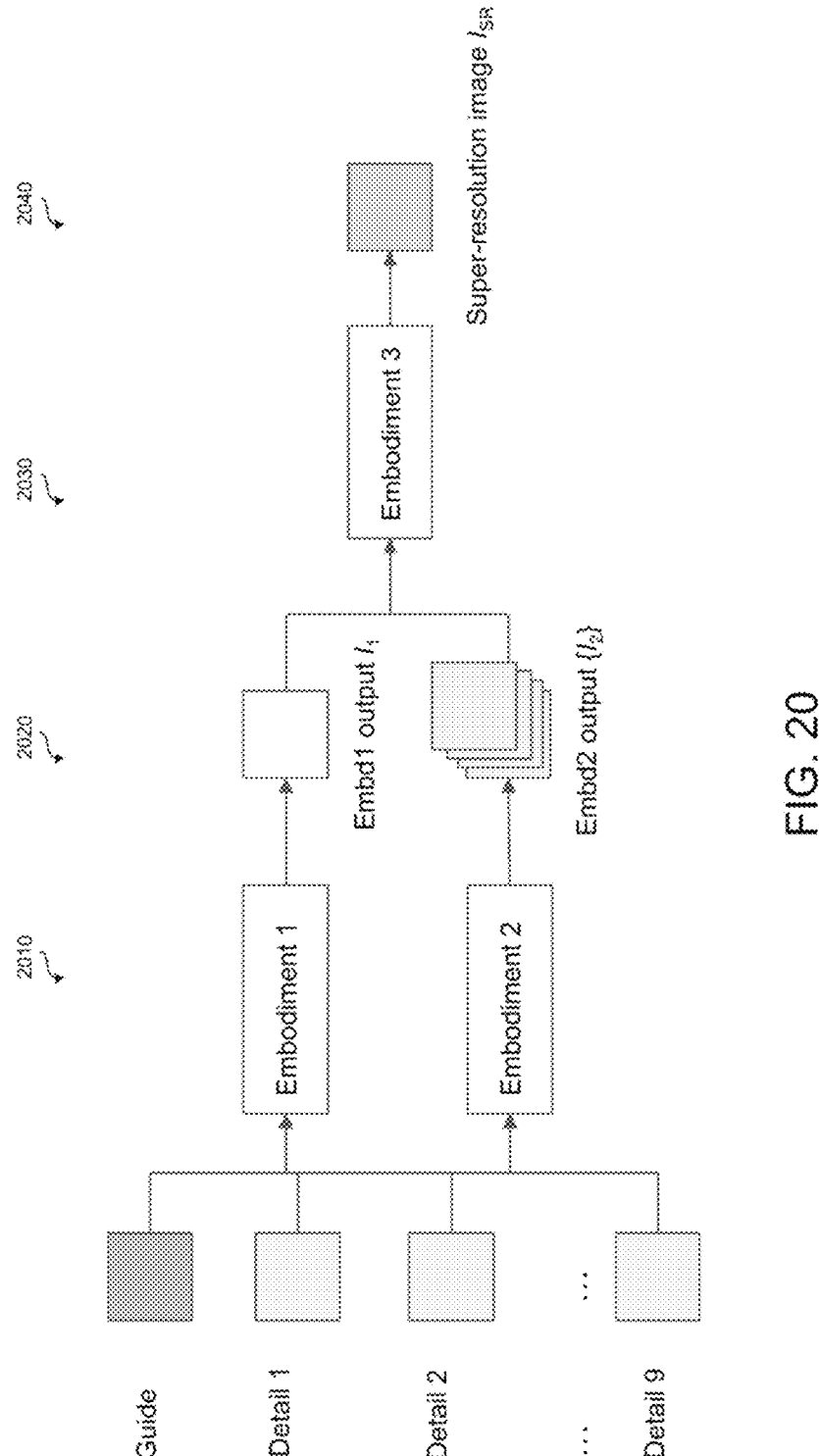
FIG. 20 illustrates an exemplary process flow for image reconstruction, according to particular embodiments.

FIG. 20 illustrates an exemplary process flow 2000 for image reconstruction, according to particular embodiments. In particular embodiments, in a step 2010, the guide image and all detail images (for e.g., 9 detail images) may be provided to a suitable algorithm based on local feature matching, such as non-limiting exemplary Embodiment 1, and output image $I_1$ may be obtained in a step 2020. In particular embodiments, in the step 2010, the guide image and all detail images (for e.g., 9 detail images) may be provided to a suitable algorithm based on using optical flow-based correspondences, such as non-limiting exemplary Embodiment 2, and an output image set $\{I_2\}$ may be obtained in the step 2020. By way of example and not limitation, $\{I_2\}$ may comprise one or a plurality of images, such as one to four images. In particular embodiments, $I_1$ from Embodiment 1 and $\{I_2\}$ from non-limiting exemplary Embodiment 2 may be fed to a suitable algorithm for fusion in a step 2030, such as non-limiting exemplary Embodiment 3, and output image $I_{SR}$ may be obtained in a step 2040. In particular embodiments, if needed for addressing motion blur and/or low light conditions, a burst mode or high frame rate capture may be selectively activated. By way of example and not limitation, a suitable algorithm for implementing a burst mode or other method to use multiple frames for burst denoising, such as the non-limiting exemplary Embodiment 4, may be activated as a pre-processing step before the camera images are fed into the network illustrated in FIG. 20.

It will be appreciated that while particular combinations of types of algorithms are described to be implemented for fusion and/or hybrid workflows, this disclosure fully contemplates combinations or incorporation of any suitable algorithms for implementing such applications as disclosed herein, using distributed sensing systems.

Figure 21:
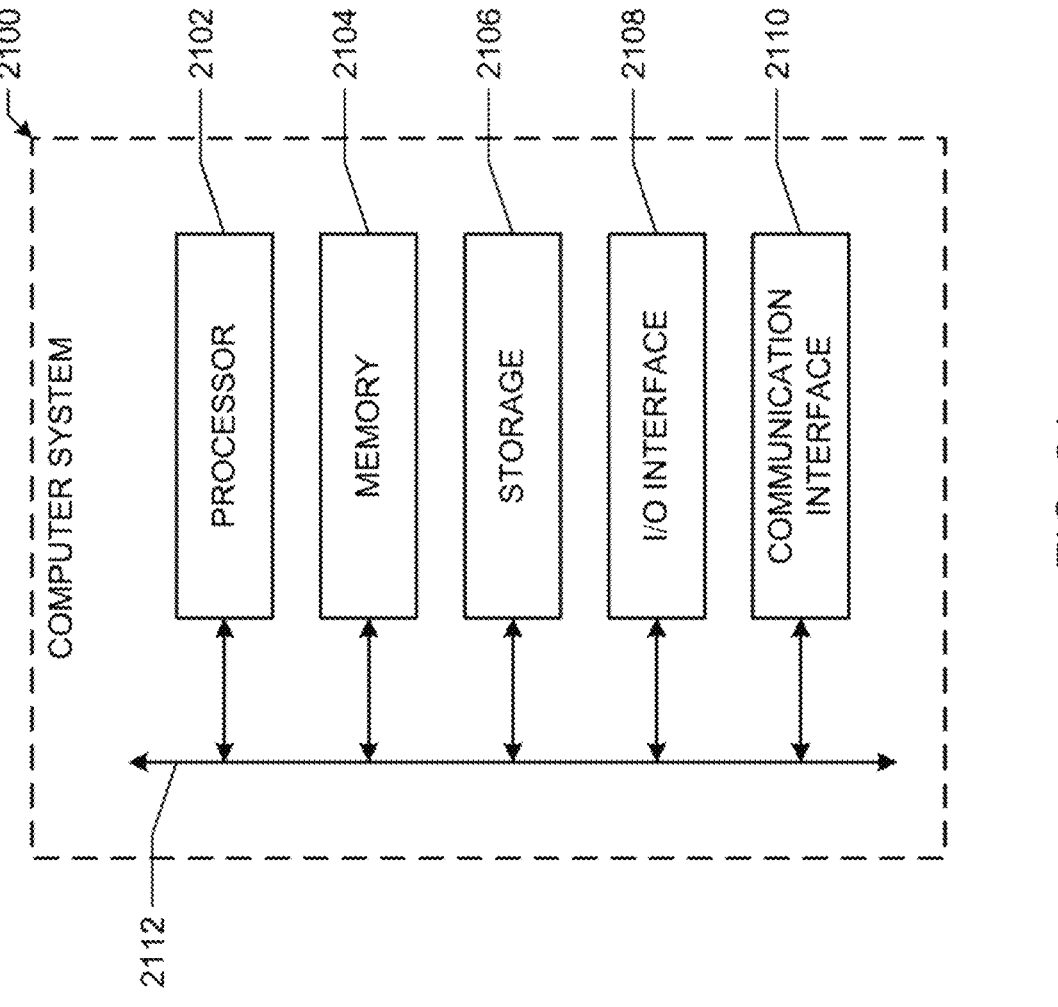
FIG. 21 illustrates an example computer system, according to particular embodiments.

The tasks, functions, and applications described above may be implemented as a series of instructions stored on a computer-readable storage medium that, when executed, cause a programmable processor to implement the operations described above. FIG. 21 illustrates an example computer system, according to particular embodiments.

In particular embodiments, one or more computer systems 2100 may perform one or more steps of one or more methods described or illustrated herein. In particular embodiments, one or more computer systems 2100 provide functionality described or illustrated herein. In particular embodiments, software running on one or more computer systems 2100 performs one or more steps of one or more methods described or illustrated herein or provides functionality described or illustrated herein. Particular embodiments include one or more portions of one or more computer systems 2100.

This disclosure contemplates any suitable number of computer systems 2100. This disclosure contemplates computer system 2100 taking any suitable physical form. As example and not by way of limitation, computer system 2100 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 2100 may include one or more computer systems 2100; be unitary or distributed; span multiple locations; span multiple machines; or reside in a cloud, which may include one or more cloud components in one or more networks. Where appropriate, one or more computer systems 2100 may perform without substantial spatial or temporal limitation one or more steps of one or more methods described or illustrated herein. As an example and not by way of limitation, one or more computer systems 2100 may perform in real time or in batch mode one or more steps of one or more methods described or illustrated herein. One or more computer systems 2100 may perform at various times or at different locations one or more steps of one or more methods described or illustrated herein, where appropriate.

In particular embodiments, computer system 2100 includes a processor 2102, memory 2104, storage 2106, an input/output (I/O) interface 2108, a communication interface 2110, and a bus 2112. Although this disclosure describes and illustrates a particular computer system having a particular number of particular components in a particular arrangement, this disclosure contemplates any suitable computer system having any suitable number of any suitable components in any suitable arrangement.

In particular embodiments, processor 2102 includes hardware for executing instructions, such as those making up a computer program. As an example and not by way of limitation, to execute instructions, processor 2102 may retrieve (or fetch) the instructions from an internal register, an internal cache, memory 2104, or storage 2106; decode and execute them; and then write one or more results to an internal register, an internal cache, memory 2104, or storage 2106. In particular embodiments, processor 2102 may include one or more internal caches for data, instructions, or addresses. This disclosure contemplates processor 2102 including any suitable number of any suitable internal caches, where appropriate. As an example and not by way of limitation, processor 2102 may include one or more instruction caches, one or more data caches, and one or more translation lookaside buffers (TLBs). Instructions in the instruction caches may be copies of instructions in memory 2104 or storage 2106, and the instruction caches may speed up retrieval of those instructions by processor 2102. Data in the data caches may be copies of data in memory 2104 or storage 2106 for instructions executing at processor 2102 to operate on; the results of previous instructions executed at processor 2102 for access by subsequent instructions executing at processor 2102 or for writing to memory 2104 or storage 2106; or other suitable data. The data caches may speed up read or write operations by processor 2102. The TLBs may speed up virtual-address translation for processor 2102. In particular embodiments, processor 2102 may include one or more internal registers for data, instructions, or addresses. This disclosure contemplates processor 2102 including any suitable number of any suitable internal registers, where appropriate. Where appropriate, processor 2102 may include one or more arithmetic logic units (ALUs); be a multi-core processor; or include one or more processors 2102. Although this disclosure describes and illustrates a particular processor, this disclosure contemplates any suitable processor.

In particular embodiments, memory 2104 includes main memory for storing instructions for processor 2102 to execute or data for processor 2102 to operate on. As an example and not by way of limitation, computer system 2100 may load instructions from storage 2106 or another source (such as, for example, another computer system 2100) to memory 2104. Processor 2102 may then load the instructions from memory 2104 to an internal register or internal cache. To execute the instructions, processor 2102 may retrieve the instructions from the internal register or internal cache and decode them. During or after execution of the instructions, processor 2102 may write one or more results (which may be intermediate or final results) to the internal register or internal cache. Processor 2102 may then write one or more of those results to memory 2104. In particular embodiments, processor 2102 executes only instructions in one or more internal registers or internal caches or in memory 2104 (as opposed to storage 2106 or elsewhere) and operates only on data in one or more internal registers or internal caches or in memory 2104 (as opposed to storage 2106 or elsewhere). One or more memory buses (which may each include an address bus and a data bus) may couple processor 2102 to memory 2104. Bus 2112 may include one or more memory buses, as described below. In particular embodiments, one or more memory management units (MMUs) reside between processor 2102 and memory 2104 and facilitate accesses to memory 2104 requested by processor 2102. In particular embodiments, memory 2104 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 2104 may include one or more memories 2104, where appropriate. Although this disclosure describes and illustrates particular memory, this disclosure contemplates any suitable memory.

In particular embodiments, storage 2106 includes mass storage for data or instructions. As an example and not by way of limitation, storage 2106 may include an HDD, a floppy disk drive, flash memory, an optical disc, a magneto-optical disc, magnetic tape, or a Universal Serial Bus (USB) drive or a combination of two or more of these. Storage 2106 may include removable or non-removable (or fixed) media, where appropriate. Storage 2106 may be internal or external to computer system 2100, where appropriate. In particular embodiments, storage 2106 is non-volatile, solid-state memory. In particular embodiments, storage 2106 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 2106 taking any suitable physical form. Storage 2106 may include one or more storage control units facilitating communication between processor 2102 and storage 2106, where appropriate. Where appropriate, storage 2106 may include one or more storages 2106. Although this disclosure describes and illustrates particular storage, this disclosure contemplates any suitable storage.

In particular embodiments, I/O interface 2108 includes hardware, software, or both providing one or more interfaces for communication between computer system 2100 and one or more I/O devices. Computer system 2100 may include one or more of these I/O devices, where appropriate. One or more of these I/O devices may enable communication between a person and computer system 2100. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 2108 for them. Where appropriate, I/O interface 2108 may include one or more device or software drivers enabling processor 2102 to drive one or more of these I/O devices. I/O interface 2108 may include one or more I/O interfaces 2108, where appropriate. Although this disclosure describes and illustrates a particular I/O interface, this disclosure contemplates any suitable I/O interface.

In particular embodiments, communication interface 2110 includes hardware, software, or both providing one or more interfaces for communication (such as, for example, packet-based communication) between computer system 2100 and one or more other computer systems 2100 or one or more networks. As an example and not by way of limitation, communication interface 2110 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 2110 for it. As an example and not by way of limitation, computer system 2100 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 2100 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 2100 may include any suitable communication interface 2110 for any of these networks, where appropriate. Communication interface 2110 may include one or more communication interfaces 2110, where appropriate. Although this disclosure describes and illustrates a particular communication interface, this disclosure contemplates any suitable communication interface.

In particular embodiments, bus 2112 includes hardware, software, or both coupling components of computer system 2100 to each other. As an example and not by way of limitation, bus 2112 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Bus 2112 may include one or more buses 2112, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

This disclosure contemplates one or more computer-readable non-transitory storage media implementing any suitable storage. In particular embodiments, a computer-readable storage medium implements one or more portions of processor 2102 (such as, for example, one or more internal registers or caches), one or more portions of memory 2104, one or more portions of storage 2106, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code. In particular embodiments, software is expressed in a higher-level programming language, such as, for example, C, Perl, or a suitable extension thereof. In particular embodiments, software is expressed in a lower-level programming language, such as assembly language (or machine code). In particular embodiments, software is expressed in Python, JAVA, C, or C++. In particular embodiments, software is expressed in Hyper Text Markup Language (HTML), Extensible Markup Language (XML), or other suitable markup language.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A distributed imaging system for augmented reality devices comprising:
a computing module;
a plurality of spatially distributed sensing devices in communication with the computing module, the plurality of sensing devices integrated in a frame of Augmented Reality glasses and further comprising:
a first sensing device configured to acquire a sequence of first images, each first image comprising a first field of view; and
one or more second sensing devices, each second sensing device configured to be selectively activated to acquire one or more second images, each second image respectively comprising a second field of view, wherein the respective second field of view of each second image is smaller than the first field of view;
wherein the computing module is configured to:
process, based on performing a local feature matching computation, one or more input images acquired by the first sensing device and one or more of the second sensing devices to generate a first output image;
process, based on performing an optical flow correspondence computation, the one or more input images to generate a second output image set comprising one or more second output images; and
computationally combine the first output image and the second output image set to generate a third output image having a resolution higher than a corresponding first image acquired by the first sensing device.

2. The distributed imaging system of claim 1, wherein the computing module comprises one or more computing devices.

3. The distributed imaging system of claim 2, wherein at least a subset of the plurality of sensing devices is disposed on a wearable device, the wearable device configured to be worn by a user.

4. The distributed imaging system of claim 2, wherein to generate the first output image, the computing module is configured to:
acquire, based on operating the first sensing device, a first image associated with a scene;

acquire, based on operating one or more of the second sensing devices, one or more second images, wherein each second image corresponds to a respective portion of the scene;

generate a scaled first image based on resampling the first image;

generate a composite second image comprising one or more of the second images;

generate, for each of the composite second image and the scaled first image, a respective correspondence feature map, each correspondence feature map generated by a neural network encoder;

determine, based on computing a correlation map between the respective correspondence feature maps of the composite second image and the scaled first image, a pixel-wise correspondence between the composite second image and the scaled first image;

generate, for each of the composite second image and the scaled first image, a respective content feature map;

combine, based on the determined pixel-wise correspondence, the respective content feature maps of the composite second image and the scaled first image into a composite feature map; and generate, based on decoding the composite feature map, the first output image associated with the scene, the decoding performed using a neural network decoder, the first output image having a higher resolution than the first image.

5. The distributed imaging system of claim 4, wherein generating the composite image is based on an application of epipolar constraints, or wherein determining the pixel-wise correspondence is based on an application of epipolar constraints to correlation scores of the correlation map, the epipolar constraints applied based on identifying corresponding epipolar lines in a plurality of the scaled first image and the one or more of the second images.

6. The distributed imaging system of claim 4, wherein the neural network decoder is trained based on respective imaging parameters of one or more of the plurality of sensing devices.

7. The distributed imaging system of claim 4, wherein at least a portion of the scene captured by a second sensing device spatially overlaps with the scene associated with the first image, and wherein at least a first portion of the scene captured by a first device of the second sensing devices spatially overlaps with at least a second portion of the scene captured by a second device of the second sensing devices.

8. The distributed imaging system of claim 4, wherein the sequence of first images is acquired by the first sensing device at a first sampling rate, and wherein a sequence of second images is acquired by the second sensing devices at a second sampling rate lower than the first sampling rate.

9. The distributed imaging system of claim 8, wherein an image capture triggering event of one of the plurality of second sensing devices is offset in time from an image capture triggering event of another of the plurality of second sensing devices.

10. The distributed imaging system of claim 8, wherein a burst sequence of a plurality of second images is acquired by a second sensing device in a burst mode, wherein the sampling rate for the burst sequence is equal to or higher than the first sampling rate.

11. The distributed imaging system of claim 1, wherein for generating the one or more second output images, the computing module is configured to:

acquire, based on operating the first sensing device, a first image associated with a scene;

acquire, based on operating one or more of the second sensing devices, one or more second images, wherein each second image corresponds to a respective portion of the scene;

generate a scaled first image based on resampling the first image;

determine, based on comparing each second image to the scaled first image, a respective region of interest corresponding to each second image and a first optical flow;

generate a context feature map associated with the scaled first image;

generate, corresponding to the scaled first image, a first feature map, and corresponding to each second image, a respective second feature map;

determine, based on computing correlations between the first feature map and each of the second features maps, a multi-level correlation set;

compute, based on context feature map, the first optical flow, and the multi-level correlation set, an incremental optical flow, wherein the first optical flow is updated with the computed incremental optical flow;

iterating, based on one or more convergence criteria, the computation of the incremental optical flow and the corresponding updating of the first optical flow to obtain a converged optical flow; and generate, based on the converged optical flow, the one or more second output images associated with the scene, each of the second output images having a higher resolution than the first image.

12. The distributed imaging system of claim 11, wherein the multi-level correlation set is weighed based on application of epipolar constraints, the epipolar constraints applied based on identifying corresponding epipolar lines in a plurality of the scaled first image and the one or more of the second images.

13. The distributed imaging system of claim 11, wherein the computed incremental optical flow is constrained prior to updating the first optical flow based on application of epipolar constraints, the epipolar constraints applied based on identifying corresponding epipolar lines in a plurality of the scaled first image and the one or more of the second images.

14. The distributed imaging system of claim 11, wherein determining the respective regions of interest is based on determining a homography transformation set comprising each transformation between the scaled first image and a respective second image of the one or more second images, and wherein the first optical flow is determined based on the homography transformation set.

15. The distributed imaging system of claim 1, wherein for computationally combining the first output image and the second output image set, the computing module is configured to:

acquire, based on operating the first sensing device, a first image associated with a scene;

acquire, based on operating one or more of the second sensing devices, one or more second images, wherein each second image corresponds to a respective portion of the scene;

generate a scaled first image based on resampling the first image;

generate, based on processing the input images comprising the first image and the one or more second images, the first output image and the one or more second output images;

generate, based on respective application of a degradation filter to the first output image and each of the one or more second output images, a set of degraded output images;

extract, based on processing the scaled first image, the first output image, and each of the second output images by a first neural network encoder, a first set of encoded features;

extract, based on processing the first image and each of the set of degraded output images by a second neural network encoder, a second set of encoded features;

determine, based on processing the second set of encoded features by one or more neural networks, a normalized set of attention weights;

determine, based on the attention weights and the first set of encoded features, a set of fused features; and generate, based on decoding the set of fused features, the third output image associated with the scene, the decoding performed using a neural network decoder, the third output image having a higher resolution than the first image.

16. The distributed imaging system of claim 15, wherein an image resolution of each degraded output image is equal to an image resolution of the first image.

17. The distributed imaging system of claim 15, wherein the sequence of first images is acquired by the first sensing device at a first sampling rate, and wherein a sequence of second images is acquired by the second sensing devices at a second sampling rate lower than the first sampling rate.

18. The distributed imaging system of claim 1, wherein, prior to computationally combining the first output image and the second output image set, one or more of a video mode or a burst mode is activated for one or more of the plurality of sensing devices to capture a plurality of denoising images, the denoising images processed to reduce a respective noise level of one or more images of the first output image and the second output image set.

19. The distributed imaging system of claim 18, wherein an attention-based network is used for processing the denoising images.

20. A computer-implemented method for implementing distributed imaging for augmented reality device, the method comprising:

acquiring, by a first sensing device of a plurality of spatially distributed sensing devices integrated in a frame of Augmented Reality glasses, a sequence of first images, each first image comprising a first field of view;

acquiring, by one or more second sensing devices of the plurality of spatially distributed sensing devices, one or more second images, each second image respectively comprising a respective second field of view, wherein the respective second field of view of each second image is smaller than the first field of view;

processing, by one or more computing devices in communication with the plurality of spatially distributed sensing devices and based on performing a local feature matching computation, one or more input images acquired by the first sensing device and one or more of the second sensing devices to generate a first output image;

processing, by one or more of the computing devices and based on performing an optical flow correspondence computation, the one or more input images to generate a second output image set comprising one or more second output images; and computationally combining, by one or more of the computing devices, the first output image and the second output image set to generate a third output image having a resolution higher than a corresponding first image acquired by the first sensing device.

* * * * *